US009699501B2

(12) United States Patent
Fukazawa et al.

(10) Patent No.: US 9,699,501 B2
(45) Date of Patent: Jul. 4, 2017

(54) INFORMATION PROCESSING DEVICE AND METHOD, AND PROGRAM

(71) Applicant: Sony Corporation, Tokyo (JP)

(72) Inventors: Kentaro Fukazawa, Tokyo (JP); Kenji Tanaka, Kanagawa (JP); Kyosuke Yoshida, Kanagawa (JP); Kazumasa Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/650,677

(22) PCT Filed: Jan. 10, 2014

(86) PCT No.: PCT/JP2014/050378
§ 371 (c)(1),
(2) Date: Jun. 9, 2015

(87) PCT Pub. No.: WO2014/112449
PCT Pub. Date: Jul. 24, 2014

(65) Prior Publication Data
US 2015/0373404 A1 Dec. 24, 2015

(30) Foreign Application Priority Data
Jan. 21, 2013 (JP) .................. 2013-008367

(51) Int. Cl.
*H04N 5/445* (2011.01)
*H04N 21/44* (2011.01)
(Continued)

(52) U.S. Cl.
CPC . *H04N 21/44008* (2013.01); *G06F 17/30247* (2013.01); *G06K 9/00288* (2013.01);
(Continued)

(58) Field of Classification Search
CPC ............................... H04N 21/44008
(Continued)

(56) References Cited

U.S. PATENT DOCUMENTS

2006/0053342 A1\* 3/2006 Bazakos ............ G06K 9/00335
714/37
2010/0008547 A1\* 1/2010 Yagnik .............. G06F 17/30781
382/118

(Continued)

FOREIGN PATENT DOCUMENTS

JP 2009-53916 A 3/2009
JP 2010-72708 A 4/2010
(Continued)

OTHER PUBLICATIONS

International Search Report issued Mar. 11, 2014 in PCT/JP2014/050378.

*Primary Examiner* — Michael B Pierorazio
(74) *Attorney, Agent, or Firm* — Oblon, McClelland, Maier & Neustadt, L.L.P.

(57) ABSTRACT

An information processing device that includes circuitry that selects content including at least one name specified by a user; selects a plurality of contents in which the name possibly occurs; acquires a plurality of face groups by grouping, per person, face images occurring in the plurality of contents selected by the circuitry; calculates a number of similar face groups appearing in other content for each of the plurality of face groups; acquires, as a candidate face group, a face group having a greatest number of similar face groups appearing in other content; and determines a face group to associate with the name from face groups.

14 Claims, 27 Drawing Sheets

(51) Int. Cl.
  *G06F 17/30*    (2006.01)
  *G06K 9/00*     (2006.01)
  *G06K 9/62*     (2006.01)
  *G06T 11/00*    (2006.01)
  *H04N 21/462*   (2011.01)
  *H04N 21/482*   (2011.01)

(52) U.S. Cl.
  CPC ....... *G06K 9/00677* (2013.01); *G06K 9/6218* (2013.01); *G06T 11/00* (2013.01); *H04N 21/462* (2013.01); *H04N 21/4828* (2013.01)

(58) Field of Classification Search
  USPC .......................................................... 725/53
  See application file for complete search history.

(56) References Cited

U.S. PATENT DOCUMENTS

| | | | |
|---|---|---|---|
| 2010/0067750 A1* | 3/2010 | Matsuo ............. | G06F 17/30265 382/118 |
| 2011/0129126 A1* | 6/2011 | Begeja ............... | G06K 9/00295 382/118 |
| 2012/0233168 A1 | 9/2012 | Terao et al. | |

FOREIGN PATENT DOCUMENTS

| | | |
|---|---|---|
| JP | 2010-283517 A | 12/2010 |
| WO | WO 2011/062071 A1 | 5/2011 |

\* cited by examiner

```
FACE CATALOG REGISTRATION PROCESS START
          ↓
CONDUCT CONTENT SELECTION PROCESS         S11
          ↓
CONDUCT FACE GROUP ACQUISITION PROCESS    S12
          ↓
CONDUCT FACE GROUP DETERMINATION PROCESS  S13
          ↓
CONDUCT REGISTRATION FACE IMAGE SELECTION S14
PROCESS
          ↓
         END
```

|              | CONTENT A | CONTENT B | CONTENT C |
|--------------|-----------|-----------|-----------|
| NAME         | 1         | 0         | 0         |
| FACE GROUP 1 | 0         | 1         | 0         |
| FACE GROUP 2 | 1         | 0         | 1         |
| FACE GROUP 3 | 1         | 0         | 0         |

FIG. 5

| TIME | TEXT IDENTIFICATION RESULT | SPOKEN CONTENT IDENTIFICATION RESULT | SPEAKER IDENTIFICATION RESULT | FULL IDENTIFICATION RESULT | METADATA |
|---|---|---|---|---|---|
| 00:00:00 | — | — | — | — | — |
| 00:05:00 | ◯ | ◯ | — | ◯ | ◯ |
| 00:10:00 | — | ◯ | — | ◯ | ◯ |
| 00:15:00 | — | — | ◯ | ◯ | ◯ |
| 00:20:00 | — | — | ◯ | — | ◯ |
| 00:25:00 | — | — | — | — | — |
| 00:30:00 | — | — | — | — | — |

FIG. 7

| TIME | TEXT IDENTIFICATION RESULT | SPOKEN CONTENT IDENTIFICATION RESULT | SPEAKER IDENTIFICATION RESULT | FULL IDENTIFICATION RESULT | METADATA |
|---|---|---|---|---|---|
| 00:00:00 | — | — | — | — | — |
| 00:05:00 | "JAMES" | "JAMES" | — | "JAMES" | "JAMES" |
| 00:10:00 | — | "JAMES" | — | "JAMES" | "JAMES" |
| 00:15:00 | "MARY" | "MARY" | "JAMES" | "JAMES" "MARY" | "JAMES" |
| 00:20:00 | "MARY" | — | "JAMES" | "JAMES" "MARY" | "JAMES" |
| 00:25:00 | — | — | "MARY" | "MARY" | "MARY" |
| 00:30:00 | — | — | — | — | — |

FIG. 8

| | CONTENT A | CONTENT B | CONTENT C |
|---|---|---|---|
| NAME | 1 | 0 | 0 |

A

| | CONTENT A | CONTENT B | CONTENT C |
|---|---|---|---|
| NAME | 60 | 5 | 0 |

B

| | CONTENT A | CONTENT B | CONTENT C |
|---|---|---|---|
| NAME | 90-20-70 | 5-0-10 | 0-0-0 |

C

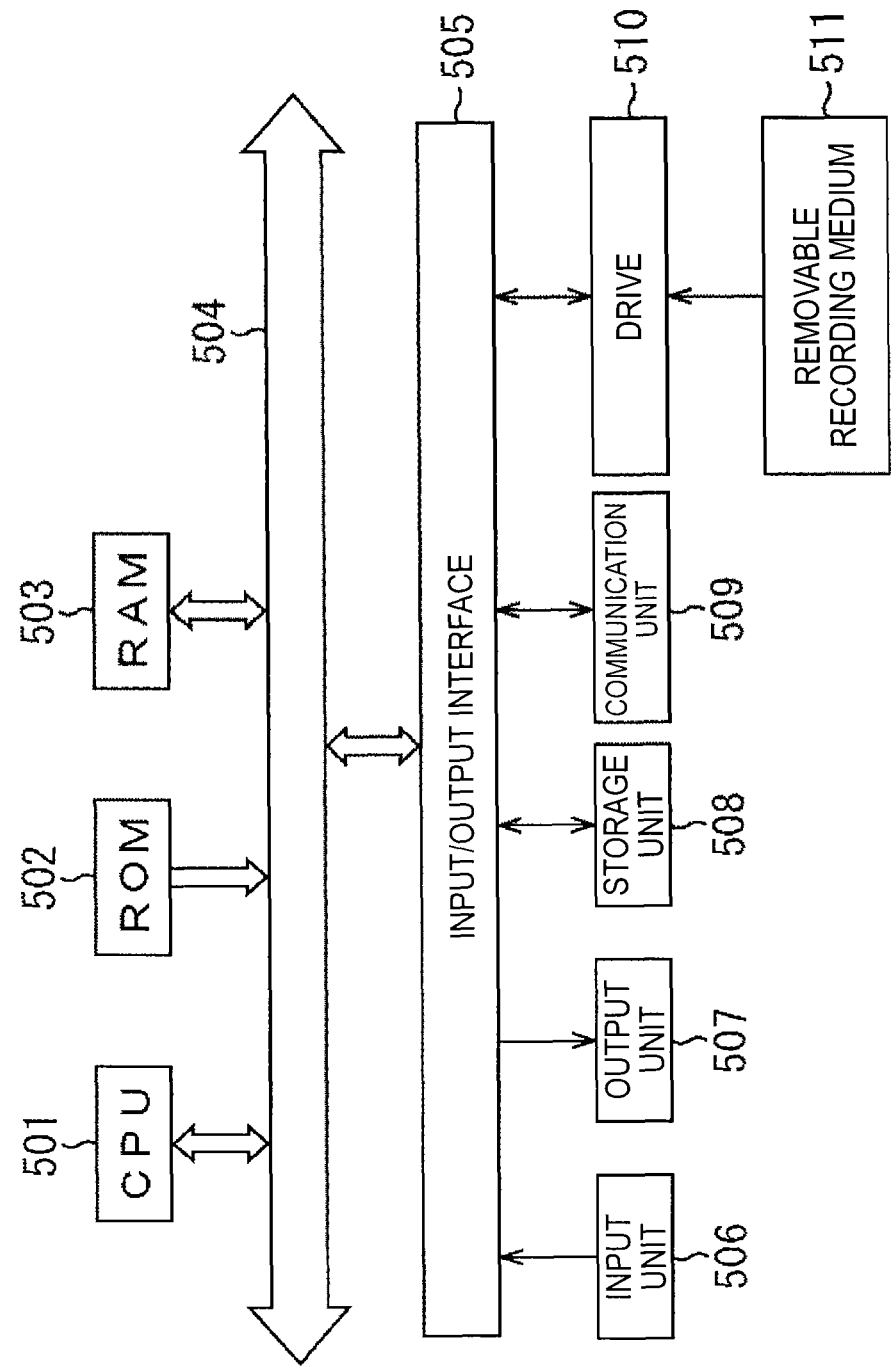

INFORMATION PROCESSING DEVICE AND METHOD, AND PROGRAM

TECHNICAL FIELD

The present disclosure relates to an information processing device, method, and program, and more particularly, to an information processing device, method, and program enabling more efficient work of registering a name and a face image feature value.

BACKGROUND ART

The technology described in Patent Literature 1 may be cited as an example of related art for personal identification using a face image. Conducting personal identification according to the technology described in Patent Literature 1 requires advance registration of names and face images in association with each other in a catalog. This registration work must be conducted manually, and as the number of persons to register increases, the workload becomes massive.

In contrast, Patent Literature 2 proposes a method of conducting such association between names and face images automatically. The technology described in Patent Literature 2 extracts names from an electronic program guide (EPG) of a program recorded by a user, collects multiple programs in which a specific name occurs, and associates a face occurring in common among the collected programs as the face corresponding to the specific name.

CITATION LIST

Patent Literature

Patent Literature 1: JP 2009-53916A
Patent Literature 2: JP 2010-283517A

SUMMARY OF INVENTION

Technical Problem

However, since the technology described in Patent Literature 2 presupposes that the person appears in the extracted program, in the hypothetical case in which that person's face cannot be detected, the common face is lost, and associating names and face images becomes difficult.

In addition, persons who are not a major character in a program and persons who appear on a news program may not necessarily be listed in the EPG. Consequently, with the technology described in Patent Literature 2, associating names and face images is difficult.

The present disclosure has been devised in light of such circumstances, and enables more efficient work of registering a name and a face image feature value.

Solution to Problem

An information processing device according to an aspect of the present disclosure includes: a content selection unit configured to select content including at least one name specified by a user; a face group acquisition unit configured to acquire face groups by grouping, per person, face images occurring in content selected by the content selection unit; and a face group determination unit configured to determine a face group to associate with the name from face groups acquired by the face group acquisition unit.

The content selection unit may acquire a name occurrence pattern indicating whether or not the name occurs within selected content, the face group acquisition unit may acquire face group occurrence patterns indicating whether or not there is an occurrence in all content selected by the content selection unit, and the face group determination unit may determine a face group to associate with the name on the basis of a similarity between the name occurrence pattern acquired by the content selection unit, and the face group occurrence patterns acquired by the face group acquisition unit.

The content selection unit may acquire the name occurrence pattern on the basis of text information or speech information within selected content, or specific person occurrence frequency data in which an occurrence frequency of a specific person obtained as a result of identifying metadata attached to content is expressed in a time series.

A display control unit configured to control display of a screen enabling selection of one face group from a plurality of face groups for which the similarity is high, and a selection unit configured to select the one face group according to a user operation may be further included, and the face group determination unit may determine a face group selected by the selection unit as the face group to associate with the name.

A comparison unit configured to compare a face group for which the similarity is high with external search result data for the name may be further included, and the face group determination unit may determine a face group that is most similar to the external search result data from among a plurality of face groups for which the similarity is high as the face group to associate with the name.

The content selection unit may select content in which the name possibly occurs, the face group acquisition unit may acquire, from among face groups in each piece of content selected by the content selection unit, as candidate face groups, face groups having a greatest number of similar face groups appearing in other content, and the face group determination unit may cluster candidate face groups acquired by the face group acquisition unit, and determine a face group belonging to a cluster with the most candidate face groups as the face group to associate with the name.

The content selection unit may select content in which the name possibly occurs on the basis of text information or speech information within selected content, or specific person occurrence frequency data in which an occurrence frequency of a specific person obtained as a result of identifying metadata attached to content is expressed in a time series.

The face group acquisition unit may exclude face groups having a low possibility to associate with the name from among face groups in each piece of content selected by the content selection unit, and acquire, from among the other face groups, as candidate face groups, face groups having a greatest number of similar face groups appearing in other content.

A display control unit configured to control display of a screen enabling selection of one face group from a plurality of face groups belonging to clusters with many of the candidate face groups, and a selection unit configured to select the one face group according to a user operation may be further included, and the face group determination unit may determine a face group selected by the selection unit as the face group to associate with the name.

A comparison unit configured to compare a plurality of face groups belonging to clusters with many of the candidate face groups with external search result data for the name may be further included, and the face group determination unit may determine a face group that is most similar to the external search result data from among a plurality of face groups belonging to clusters with many of the candidate face groups as the face group to associate with the name.

A face image selection unit configured to select a face image to register in a catalog from among a face image collection in a face group determined by the face group determination unit may be further included.

The face image selection unit may select a representative face in each cluster as a result of clustering from among a face image collection in a face group determined by the face group determination unit as a face image to register in a catalog.

An information processing method according to an aspect of the present disclosure, performed by an information processing device, includes: selecting content including at least one name specified by a user; acquiring face groups by grouping, per person, face images occurring in the selected content; and determining a face group to associate with the name from the acquired face groups.

A program according to an aspect of the present disclosure causes a computer to function as: a content selection unit configured to select content including at least one name specified by a user; a face group acquisition unit configured to acquire face groups by grouping, per person, face images occurring in content selected by the content selection unit; and a face group determination unit configured to determine a face group to associate with the name from face groups acquired by the face group acquisition unit.

In an aspect of the present disclosure, content including at least one name specified by a user is selected, face images occurring in the selected content are grouped per person, and face groups are acquired. Subsequently, a face group to associate with the name is decided from among the acquired face groups.

Advantageous Effects of Invention

According to the present disclosure, more efficient work of registering a name and a face image feature value is possible.

BRIEF DESCRIPTION OF DRAWINGS

FIG. 5 is a diagram illustrating an example of specific person occurrence frequency data.

FIG. 7 is a diagram illustrating an example of person occurrence frequency data.

FIG. 8 is a diagram illustrating a data example of a name occurrence pattern.

FIG. 29 is a block diagram illustrating an exemplary configuration of a computer.

DESCRIPTION OF EMBODIMENTS

Hereinafter, embodiments for carrying out the present disclosure (hereinafter designated embodiments) will be described. Hereinafter, the description will proceed in the following order.
1. Embodiment (information processing device)
2. Embodiment (information processing device)
3. Embodiment (computer)

1. Embodiment (Information Processing Device)

[Configuration of Information Processing Device According to Present Technology]

Figure 1:
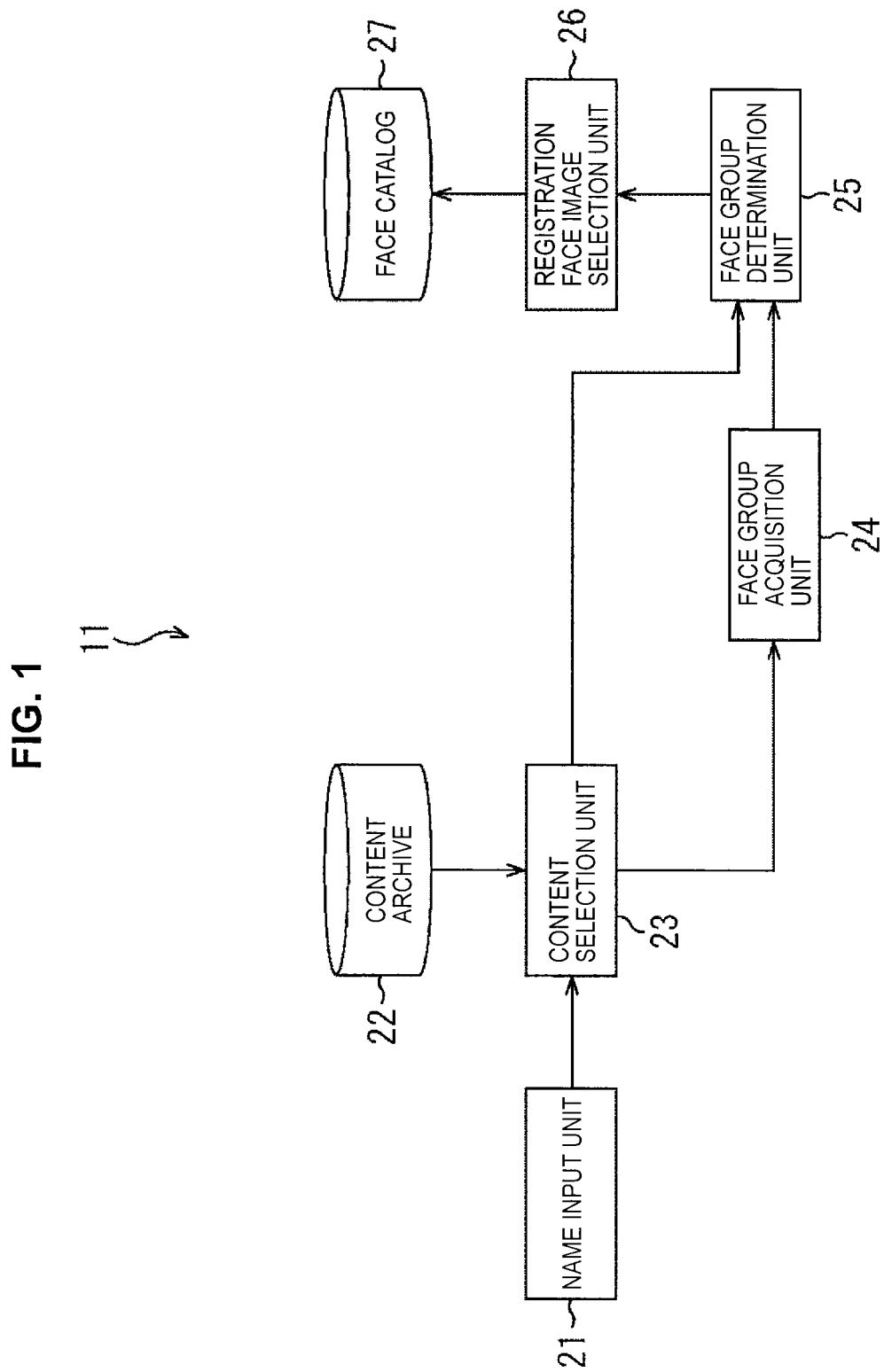
FIG. 1 is a block diagram illustrating an exemplary configuration of an information processing device applying the present technology.

FIG. 1 is a diagram illustrating an exemplary configuration of an information processing device applying the present technology.

As an example, the information processing device 11 in FIG. 1 registers in a catalog a face image and a face image feature value corresponding to a name, and conducts searches on the catalog, even if the input name is not registered in the catalog. The information processing device 11 is made up of a personal computer or the like, for example.

In the example of FIG. 1, the information processing device 11 includes a name input unit 21, a content archive 22, a content selection unit 23, a face group acquisition unit 24, a face group determination unit 25, a registration face image selection unit 26, and a face catalog 27.

The name input unit 21 inputs a name specified by a user (hereinafter also designated the specific name), and supplies the input name to the content selection unit 23. The content archive 22 registers and manages content.

The content selection unit 23 selects arbitrary content from inside the content archive 22. In addition, the content selection unit 23 acquires a name occurrence pattern, which is information indicating whether or not the specific name from the name input unit 21, or in other words the person having the specific name (hereinafter also designated the specific person), occurs within each piece of content. Note that herein, at least one piece of content in which the specific person possibly appears must be included among the selected content. The content selection unit 23 supplies the acquired name occurrence pattern, together with the selected content, to the face group acquisition unit 24. In addition, the content selection unit 23 supplies the acquired name occurrence pattern to the face group determination unit 25.

The face group acquisition unit 24 conducts a process that groups faces occurring in each piece of selected content, and collects the same person into a single group. In addition, the face group acquisition unit 24 acquires for each face group a face group occurrence pattern, which is information indicating whether or not that face group occurs in each piece of content. The face group acquisition unit 24 supplies the acquired face group occurrence pattern to the face group determination unit 25.

The face group determination unit 25 determines a face group to associate with the specific name from among the face groups acquired by the face group acquisition unit 24. Specifically, the face group determination unit 25 conducts a process of comparing the name occurrence pattern from the content selection unit 23 with each face group occurrence pattern from the face group acquisition unit 24. Subsequently, the face group determination unit 25 determines the face group having the face group occurrence pattern that is most similar to the name occurrence pattern as a face group to associate with the specific name. The face group determination unit 25 supplies information about the determined face group to the registration face image selection unit 26.

The registration face image selection unit 26 selects and registers in the face catalog 27 a specified number of face images and face image features values from among all face images belonging to all face groups determined by the face group determination unit 25. The face images to be selected may be representative faces from each face group acquired by the face group determination unit 25, or all faces belonging to each face group.

For example, when using representative faces from each face group, the representative face images from each face group are categorized into an arbitrary number of clusters according to face feature value. For the clustering, an arbitrary technique such as k-means clustering is used. The registration face image selection unit 26 acquires a representative face in each cluster, and registers the representative image or face feature value from each cluster in the face catalog 27. Alternatively, categorization by the time period when content was recorded, the content type, and the like is also possible.

The face catalog 27 registers and manages face images and face image feature values in association with names.

[Operation of Information Processing Device]

Next, a face catalog registration process which is an operation of the information processing device 11 will be described with reference to the flowchart in FIG. 2.

For example, a name specified by the user is input into the content selection unit 23 via the name input unit 21. In step S11, the content selection unit 23 conducts a content selection process. The content selection process will be described later in detail with reference to FIG. 4.

According to the process in step S11, there is acquired a name occurrence pattern, which is information indicating whether or not the specific name occurs in each piece of content. The name occurrence pattern is supplied together with the content to the face group acquisition unit 24.

In step S12, the face group acquisition unit 24 conducts a face group acquisition process. The face group acquisition process will be described later in detail with reference to FIG. 9.

According to the process in step S12, faces occurring in each piece of selected content are grouped, and for each group, there is acquired a face group occurrence pattern, which is information indicating whether or not that face group occurs in each piece of content. The face group occurrence patterns are supplied to the face group determination unit 25.

In addition, the name occurrence pattern acquired in step S11 is also supplied to the face group determination unit 25.

In step S13, the face group determination unit 25 conducts a face group determination process. The face group determination process will be described later in detail with reference to FIG. 12.

According to the process in step S13, a process of comparing the name occurrence pattern from the content selection unit 23 and each face group occurrence pattern from the face group acquisition unit 24 is conducted. Subsequently, the face group having the face group occurrence pattern that is most similar to the name occurrence pattern is determined as the face group to associate with the name.

Figures 2, 3:
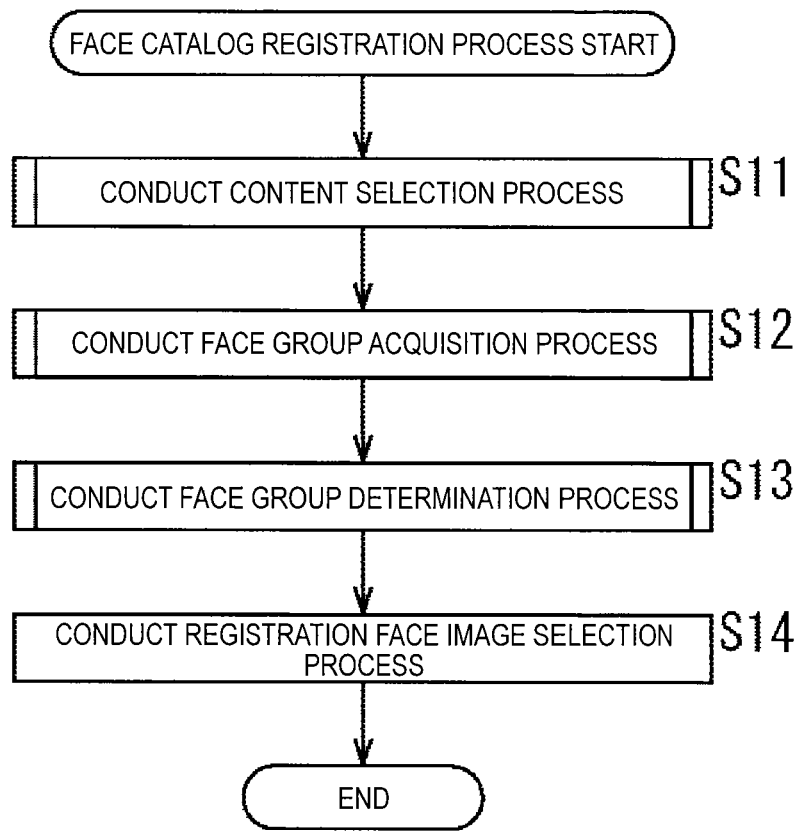
FIG. 2 is a flowchart describing a face catalog registration process of an information processing device.
FIG. 3 is a diagram illustrating an example of a name occurrence pattern and face group occurrence patterns.

FIG. 3 illustrates an example of a name occurrence pattern for respective pieces of content, and respective face group occurrence patterns for face groups 1 to 3. In the example of FIG. 3, "1" indicates that the name occurs in the content, while "0" indicates that the name does not occur.

Since the input name occurs in the content A, but does not occur in the content B and C, the name occurrence pattern becomes "100". Since the face group 1 does not occur in the content A and C, but occurs in the content B, the group occurrence pattern of the face group 1 becomes "010". Since the face group 2 occurs in the content A and C, but does not occur in the content B, the group occurrence pattern of the face group 2 becomes "101". Since the face group 3 occurs in the content A, but does not occur in the content B and C, the group occurrence pattern of the face group 3 becomes "100".

Consequently, the face group having the group occurrence pattern that is most similar to the name occurrence pattern "100" is the face group 3, and the face group 3 is determined as the face group to associate with the person. Information about the determined face group is supplied to the registration face image selection unit 26.

In step S14, the registration face image selection unit 26 conducts a registration face image selection process. In other words, the registration face image selection unit 26 selects a specified number of face images and face image feature values from among the face group determined by the face group determination unit 25, and registers in the face catalog 27 the selected face images and face image feature values in association with the name.

According to the above, in the information processing device 11, face images and face image feature values are registered in the face catalog 27 in association with a name, enabling searches to be conducted. Consequently, more efficient catalog registration work is possible.

[Example of Content Selection Process]

Figure 4:
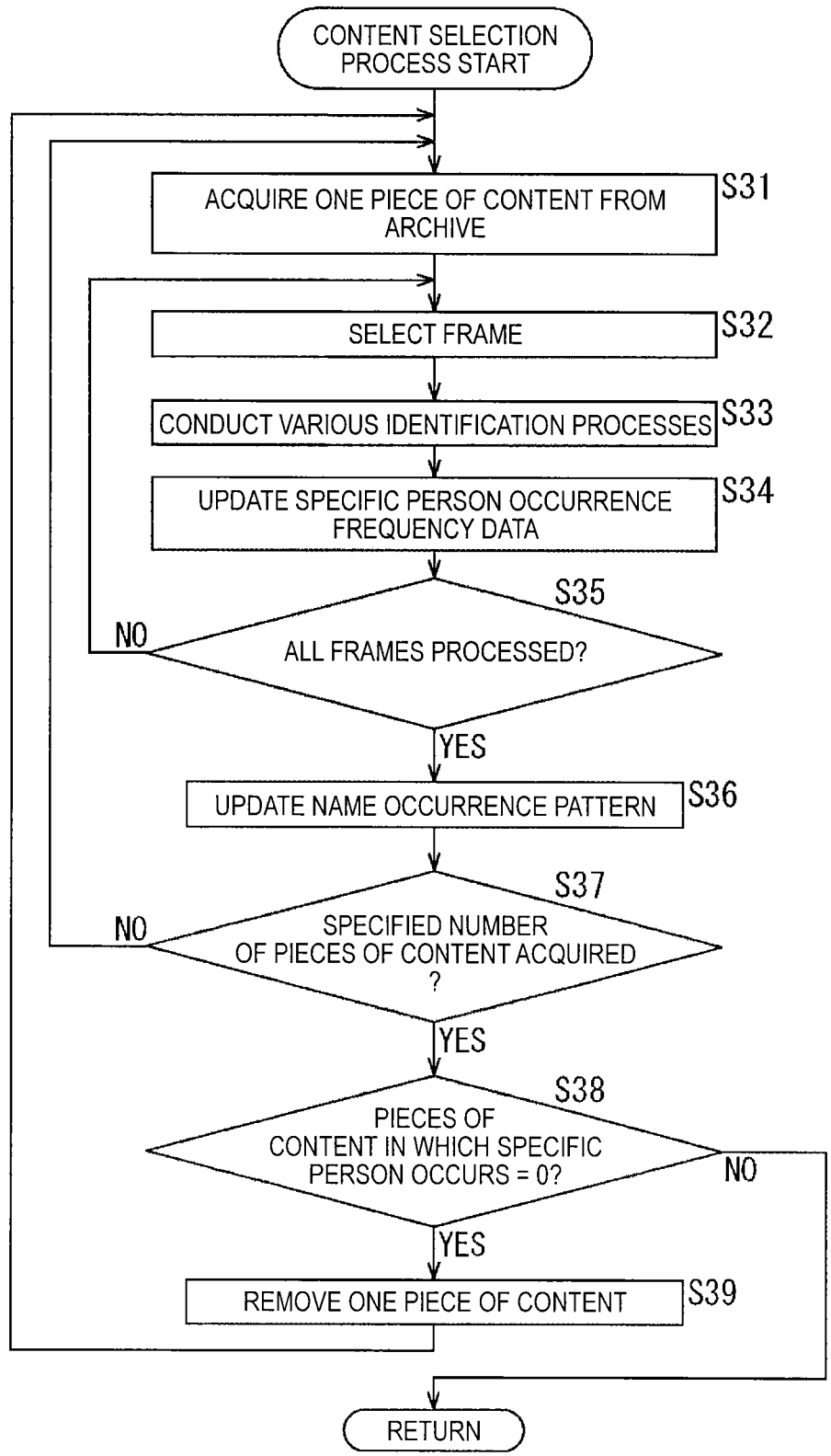
FIG. 4 is a flowchart describing a content selection process.

Next, the content selection process in step S11 of FIG. 2 will be described with reference to the flowchart in FIG. 4. In the content selection process, an arbitrary number of pieces of content are acquired from inside the content archive 22, so that at least one piece of content in which the specific person possibly appears is included.

The content selection unit 23 acquires one piece of content from the archive (content archive 22) in step S31, and selects a frame in step S32.

In step S33, the content selection unit 23 conducts various identification processing on the selected frame. In other words, in steps S32 and S33, at an arbitrary time interval, metadata attached to the content is read, and the various identification processing judges whether or not the specific name or speech by the specific person occurs.

Herein, the identification processing refers to processing to identify text information in a screen, and may be processing to identify spoken content, and additionally is processing using text, speech, or other information in a picture, such as processing to identify a speaker. Consequently, the identification processing is not required to be limited to the above, insofar as it is possible to identify whether or not the specific person is present.

In step S34, every time the above identification processing is conducted, the content selection unit 23 updates specific person occurrence frequency data as a result. The details written to the specific person occurrence frequency data are a time position at which identification was conducted, and information indicating whether or not there is an occurrence. Herein, the information indicating whether or not there is an occurrence may be included for every identification processing result, collected into a single piece of information, or both. In addition, information such as the size of the text and the volume of speech at the time of identification may also be written.

FIG. 5 illustrates an example of specific person occurrence frequency data. In the example of FIG. 5, a text identification result, a spoken content identification result, and a full identification result with respect to the specific person identified every five minutes, as well as an identification result indicating the presence of metadata, are indicated in a time series.

The example of FIG. 5 indicates that 5 minutes after the start of the content, there was a text identification result with respect to the specific person. Also indicated is that 5 minutes after and 10 minutes after the start of the content, there was a speech identification result with respect to the specific person. Also indicated is that 15 minutes after and 20 minutes after the start of the content, there was a speech identification result with respect to the specific person.

Additionally, it is indicated that from 5 minutes to 20 minutes after the start of the content, there was a full identification result. Furthermore, it is indicated that from 5 minutes to 20 minutes after the start of the content, there was metadata.

Returning to FIG. 4, in step S35, the content selection unit 23 determines whether or not all frames have been processed. In the case of determining that not all frames have been processed in step S35, the process returns to step S32, and the processing thereafter is repeated.

In step S35, in the case of determining that all frames have been processed, the process proceeds to step S36. In step S36, the content selection unit 23 updates the name occurrence pattern on the basis of the updated specific person occurrence frequency data.

In step S37, the content selection unit 23 determines whether or not a specified number of pieces of content have been acquired. In step S37, in the case of determining that the specified number of pieces of content have not been acquired, the process returns to step S31, and the processing thereafter is repeated.

In step S37, in the case of determining that the specified number of pieces of content have been acquired, the process proceeds to step S38. In step S38, the content selection unit 23 determines whether or not the number of pieces of content in which the specific person appears is 0. In the case of determining that the number of pieces of content in which the specific person appears is 0 in step S38, the process proceeds to step S39.

In step S39, the content selection unit 23 removes one piece of content, and the process returns to step S31. In step S38, in the case of determining that the number of pieces of content in which the specific person appears is not 0, the content selection process in FIG. 4 ends.

Note that an example is described in which the identification processing in the content selection process described above is conducted every time a name is specified. However, the identification processing is not required to be conducted every time a name is specified. In other words, information related to a person occurring in a piece of content and the frequency of occurrence may be acquired in advance for each piece of content and stored in memory or the like, for example, and on the basis of the information, the name occurrence pattern may be updated. An example of the content selection process in this case is illustrated in the following FIG. 6.

[Another Example of Content Selection Process]

Figure 6:
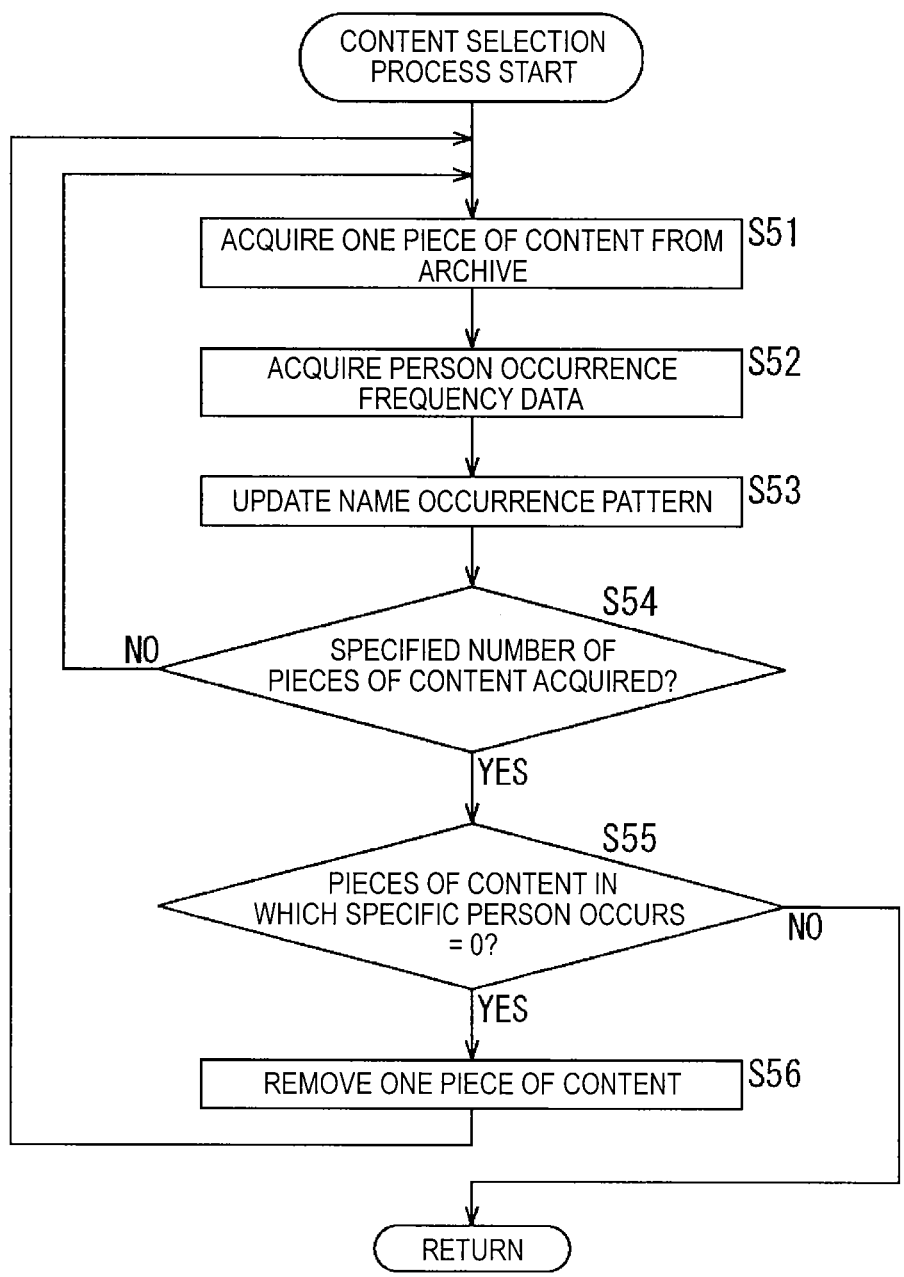
FIG. 6 is a flowchart describing another example of a content selection process.

Next, another example of the content selection process in step S11 of FIG. 2 will be described with reference to the flowchart in FIG. 6.

In step S51, the content selection unit 23 acquires one piece of content from the archive (content archive 22). In step S52, the content selection unit 23 acquires name occurrence frequency data for the acquired content from memory (not illustrated) or the like, for example.

FIG. 7 illustrates an example of person occurrence frequency data. In the example of FIG. 7, a text identification result, a spoken content identification result, and a full identification result with respect to multiple persons occurring in the content (for example, James and Mary) identified every five minutes, as well as an identification result indicating the presence of metadata, are indicated in a time series.

The example of FIG. 7 indicates that 5 minutes after the start of the content, there was a text identification result for James, while 15 minutes after and 20 minutes after, there was a text identification result for Mary. Also indicated is that 5 minutes after and 10 minutes after the start of the content, there was a speech identification result for James, while 15 minutes after and 20 minutes after, there was a speech identification result for Mary. Also indicated is that 15 minutes after and 20 minutes after the start of the content, there was a speech identification result for James, while 25 minutes after, there was a speech identification result for Mary.

Additionally, it is indicated that from 5 minutes to 20 minutes after the start of the content, there was a full identification result for James, while from 15 minutes to 25 minutes after, there was a full identification result for Mary.

Furthermore, it is indicated that from 5 minutes to 20 minutes after the start of the content, there was metadata for James, while 25 minutes after, there was metadata for Mary.

Returning to FIG. 6, in step S53, the content selection unit 23 updates the name occurrence pattern on the basis of the acquired person occurrence frequency data.

In step S54, the content selection unit 23 determines whether or not a specified number of pieces of content have been acquired. In step S54, in the case of determining that the specified number of pieces of content have not been acquired, the process returns to step S51, and the processing thereafter is repeated.

In step S54, in the case of determining that the specified number of pieces of content have been acquired, the process proceeds to step S55. In step S55, the content selection unit 23 determines whether or not the number of pieces of content in which the specific person appears is 0. In the case of determining that the number of pieces of content in which the specific person appears is 0 in step S55, the process proceeds to step S56.

In step S56, the content selection unit 23 removes one piece of content, and the process returns to step S51. In step S55, in the case of determining that the number of pieces of content in which the specific person appears is not 0, the content selection process in FIG. 6 ends.

[Data Example of Name Occurrence Pattern]

FIG. 8 is a diagram illustrating a data example of a name occurrence pattern. The data of the name occurrence pattern is configured so that a specific person occurs if the occurrence frequency is greater than a threshold value.

For example, in FIG. 8A, "1" indicates that the specific person occurs in the content, while "0" indicates that the specific person does not occur. Since the name occurs in the content A, but does not occur in the content B and C, the person occurrence pattern becomes "100".

In this way, the data of the name occurrence pattern may be expressed with the two-level values of 1 and 0.

FIG. 8B illustrates an example of using n-level values to express the degree of occurrence frequency with respect to the content overall as the data of the name occurrence pattern. In the case of FIG. 8B, the content A is "60", the content B is "5", and the content C is "1". This means that the specific person occurs at a ratio of 60 in the content A, occurs at a ratio of 5 in the content B, and does not occur in the content C.

Note that the examples of FIG. 8A and FIG. 8B illustrate examples of expressing one value for one piece of content. In contrast, as illustrated in FIG. C, content may be subdivided into several sections, a value related to occurrence may be computed for each section, and the values may be combined to express the data of the name occurrence pattern. In other words, it is possible to treat information related to occurrence frequency as a number of n-level values equal to the number of sections.

In FIG. 8C, the data of the name occurrence pattern of the content A is indicated as "90-20-70", while the data of the name occurrence pattern of the content B is indicated as "5-0-10". Also, the data of the name occurrence pattern of the content C is indicated as "0-0-0".

In other words, in the case of FIG. 8C, it is indicated that, in the content A, the specific person occurs at a ratio of "90" in a first section, occurs at a ratio of "20" in a second section, and occurs at a ratio of "70" in a third section. Also indicated is that, in the content B, the specific person occurs at a ratio of "5" in a first section, does not occur in a second section, and occurs at a ratio of "10" in a third section. Also indicated is that, in the content C, the specific person does not occur in any of a first section to a third section.

Herein, the information related to occurrence frequency may be computed by using a collection of full identification results as described above, or by using only identification results specified by the user. In addition, not only the occurrence frequency but also the text size or volume may be used to apply a weighting.

[Example of Face Group Acquisition Process]

Next, the face group acquisition process in step S12 of FIG. 2 will be described with reference to the flowchart in FIG. 9. In this process, face images occurring in all content selected by the content selection unit 23 are detected, a grouping process is conducted per person, and only face groups having a high likelihood of correspondence with the specific person are acquired.

In step S71, the face group acquisition unit 24 conducts a face grouping process. Note that the face grouping process will be described later in detail with reference to FIG. 10.

According to the process in step S71, face images occurring within the content are detected, the detected face images are grouped per person, and the face groups are registered in a face group list, which is a list of face groups. Note that this process is conducted on all content selected by the content selection unit 23. In addition, grouping is not conducted per piece of content, but instead conducted over all content.

In step S72, the face group acquisition unit 24 selects one face group from the face group list, and conducts personal identification per face group. In step S73, the face group acquisition unit 24 determines whether or not a face belonging to the face group selected in step S72 matches a person already registered in a built-in catalog.

In step S73, in the case of determining that a face belonging to the selected face group matches an already-registered person, the process proceeds to step S74. In other words, in this case, since the face group is clearly not of a face that should be associated with the specific person input into the name input unit 21, in step S74, the face group acquisition unit 24 removes that face group from the face group list.

In step S73, in the case of determining that a face belonging to the selected face group does not match an already-registered person, the process proceeds to step S75. In step S75, the face group acquisition unit 24 creates a face group occurrence pattern for that face group.

This pattern data is created using the same criteria as when creating the name occurrence pattern, in other words, the same criteria as when creating the name occurrence pattern, that is, the same number of levels n of a variable indicating the occurrence ratio, the same number of sections subdividing the content, and the same section division positions. Values related to the occurrence ratio may be computed according to a method similar to the name occurrence pattern, but may also be computed by using weighted factors in addition to the occurrence ratio of the face image, such as the size of the face image, the position of the face (distance from screen center), and the number of persons occurring at the same time.

In step S76, the face group acquisition unit 24 determines whether or not the above process has been conducted on all face groups. In step S76, in the case of determining that not all face groups have been processed, the process returns to step S72, and the processing thereafter is repeated.

Figure 9:
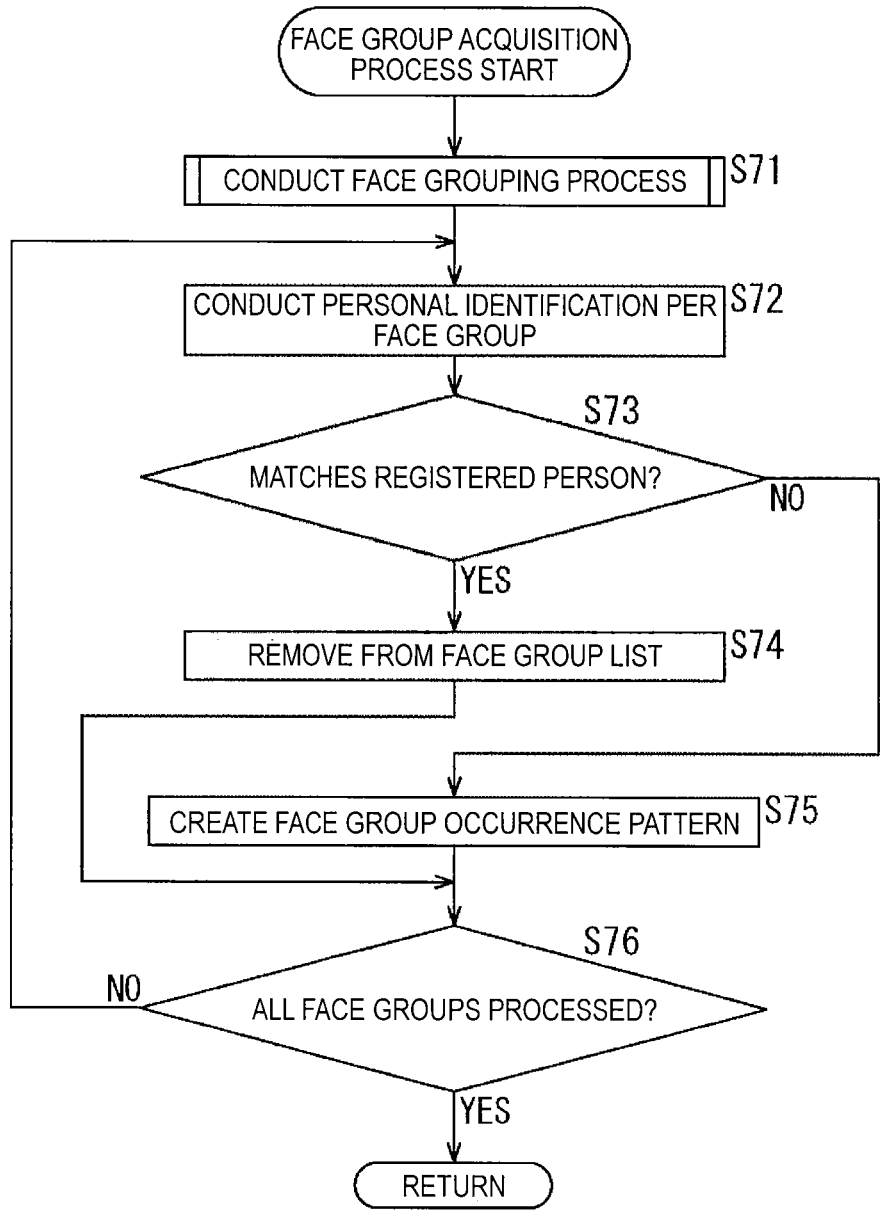
FIG. 9 is a flowchart describing a face group acquisition process.

In step S76, in the case of determining that all face groups have been processed, the face group acquisition process of FIG. 9 ends. Subsequently, the face group occurrence patterns created for every face group are supplied to the face group determination unit 25.

[Example of Face Grouping Process]

Figure 10:
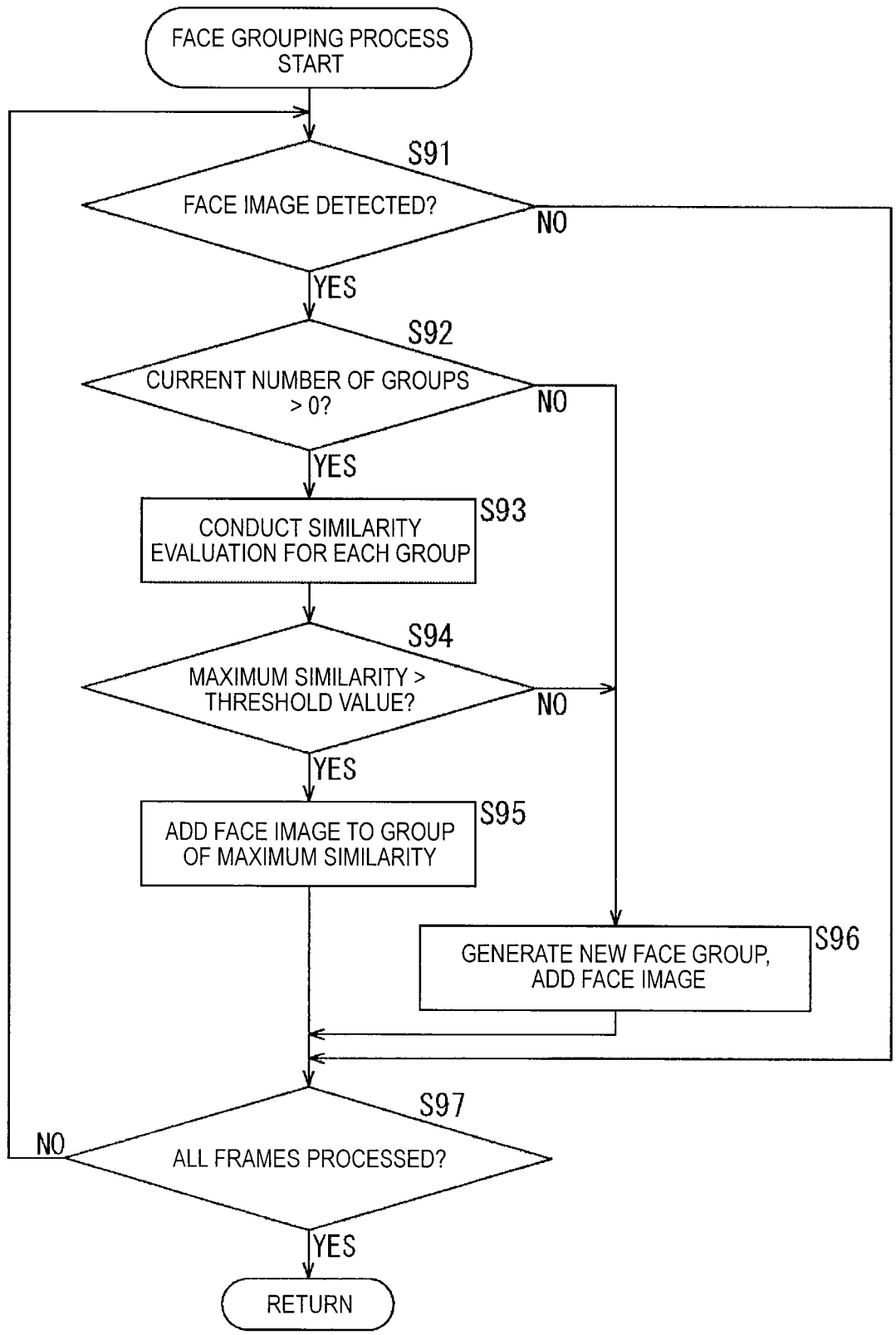
FIG. 10 is a flowchart describing a face grouping process.

Next, the face grouping process in step S11 of FIG. 9 will be described with reference to the flowchart in FIG. 10. Note that this process is conducted on the entirety of a moving image at an arbitrary time interval starting from the first frame of the moving image.

In step S91, the face group acquisition unit 24 determines whether or not a face image has been detected. In step S91, in the case of determining that a face image has been detected, the process proceeds to step S92.

In step S92, the face group acquisition unit 24 determines whether or not the current number of groups is greater than 0. In step S92, in the case of determining that the current number of groups is 1 or greater, the process proceeds to step S93.

In step S93, the face group acquisition unit 24 conducts a similarity evaluation for each group. In other words, the face group acquisition unit 24 evaluates the similarity of face images registered in an existing group to the face image that was just detected.

In step S94, the face group acquisition unit 24 determines whether or not the greatest similarity computed from among the groups (maximum similarity) is greater than a threshold value. In step S94, in the case of determining that the maximum similarity is greater than the threshold value, the process proceeds to step S95.

In step S95, the face group acquisition unit 24 adds the detected face image to the group with the maximum similarity. In other words, the face group acquisition unit 24 treats the detected face image as a face of the same person as the faces registered in the group that yielded the maximum similarity, and adds the detected face image as a member of that group.

On the other hand, in step S92, in the case of determining that the current number of groups is 0, the process proceeds to step S96. Also, in step S94, in the case of determining that the maximum similarity is less than or equal to the threshold value, the detected face image is likewise treated as a separate person from any of the groups, and the process proceeds to step S96. In step S96, the face group acquisition unit 24 generates a new face group, and adds the detected face image as a member. Subsequently, the face group acquisition unit 24 registers the created face group in the face group list.

In step S91, in the case of determining that a face image has not been detected, the process proceeds to step S97. In step S97, the face group acquisition unit 24 determines whether or not all frames constituting the moving image have been processed.

In step S97, in the case of determining that not all frames have been processed, the process returns to step S91, and the processing thereafter is repeated on a frame at an arbitrary time interval. In step S97, in the case of determining that all frames have been processed, the face grouping process ends, and the process returns to step S71 in FIG. 9.

Note that the face grouping process is not limited to the process described with reference to FIG. 10, and that any method may be used insofar as grouping is possible.

[Example of Face Group Determination Process]

Figure 11:
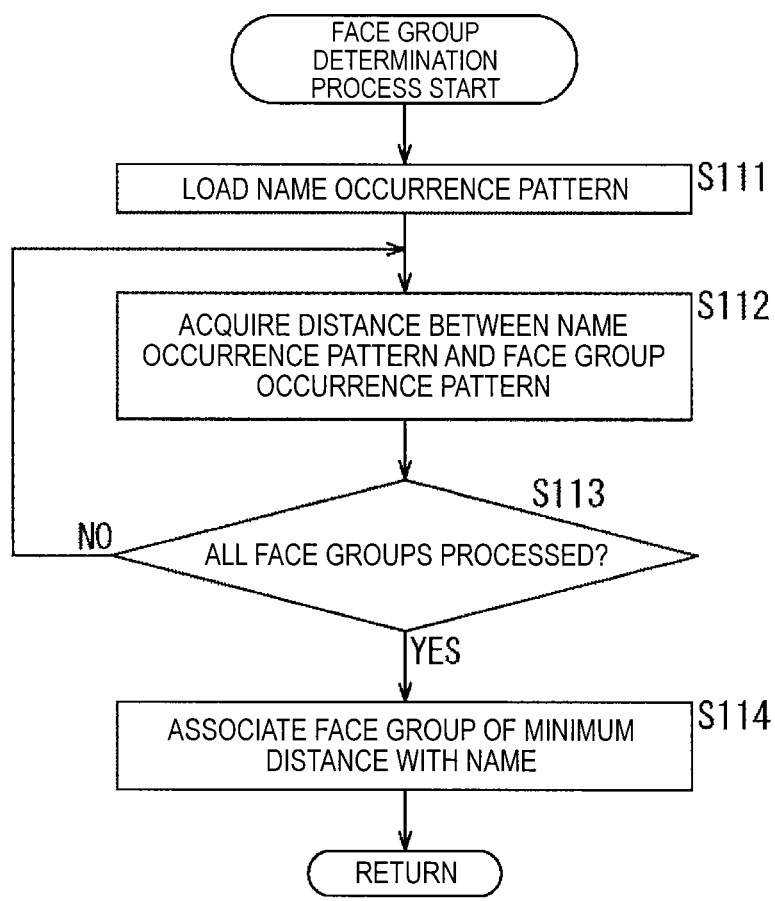
FIG. 11 is a flowchart describing a face group determination process.

Next, the face group determination process in step S13 of FIG. 2 will be described with reference to the flowchart in FIG. 11. In this process, similarity is evaluated between the name occurrence pattern computed by the content selection unit 23 and face group occurrence patterns computed by the face group acquisition unit 24, and on the basis of the results, a face group to associate with the specific name is determined.

In step S111, the face group determination unit 25 loads a name occurrence pattern from the content selection unit 23. In step S112, the face group determination unit 25 acquires the distance of similarity between the loaded name occurrence pattern and a face group occurrence pattern acquired by the face group acquisition unit 24.

In step S113, the face group determination unit 25 determines whether or not the processing in step S112 has been conducted on all face groups. In step S113, in the case of determining that not all face groups have been processed, the process returns to step S112, and the processing thereafter is repeated.

In step S113, in the case of determining that all face groups have been processed, the process proceeds to step S114. In step S114, the face group determination unit 25 associates the group of minimum distance with the specific name.

Note that although the above describes an example of selecting the face group having the minimum distance when deciding a face group, as described next, several high-ranking face groups may also be treated as candidates and presented to the user for selection by the user.

[Exemplary Configuration of Face Group Determination Unit]

Figure 12:
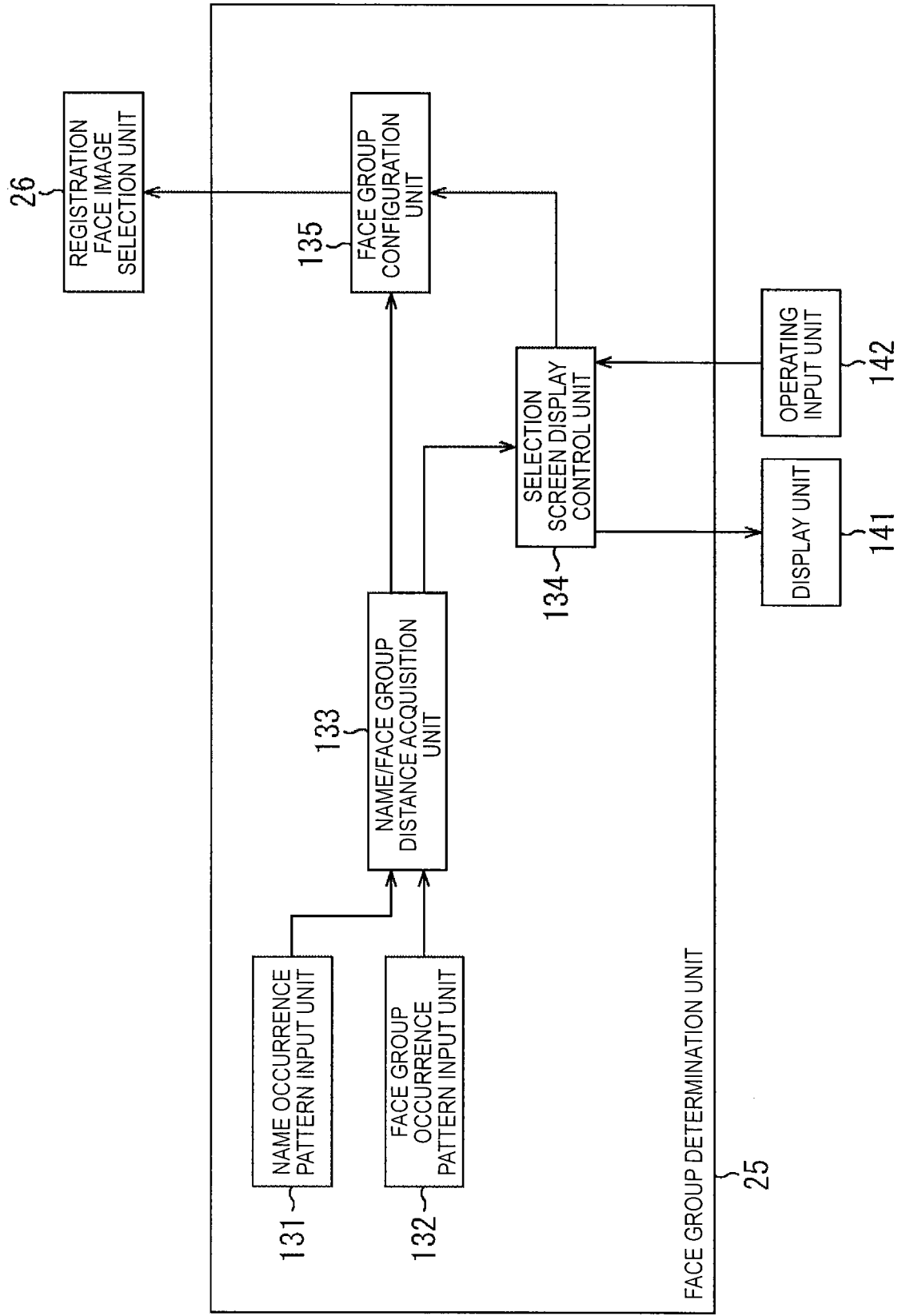
FIG. 12 is a block diagram illustrating an exemplary configuration of a face group determination unit.

FIG. 12 is a block diagram illustrating an exemplary configuration of a face group determination unit in the case in which several high-ranking face groups are treated as candidates and presented to the user for selection by the user.

In the example of FIG. 12, the face group determination unit 25 includes a name occurrence pattern input unit 131, a face group occurrence pattern input unit 132, a name/face group distance acquisition unit 133, a selection screen display control unit 134, and a face group configuration unit 135.

Also, in this case, the information processing device 11 also includes a display unit 141 and an operating input unit 142 in addition to the configuration discussed earlier with reference to FIG. 1.

The name occurrence pattern input unit 131 loads and supplies to the name/face group distance acquisition unit 133 a name occurrence pattern from the content selection unit 23. The face group occurrence pattern input unit 132 loads and supplies to the name/face group distance acquisition unit 133 face group occurrence patterns from the face group acquisition unit 24.

The name/face group distance acquisition unit 133 acquires the distance between the name occurrence pattern and a face group occurrence pattern, for all face groups. Subsequently, the name/face group distance acquisition unit 133 treats the face group of minimum distance as a first candidate face group, and supplies information about several high-ranking face groups to the selection screen display control unit 134 and the face group configuration unit 135.

In one process, when there is a user selection, the selection screen display control unit 134 generates a selection screen enabling the selection of one face group name from among candidate face group names made up of face group names that are candidates for the face group to associate with the name. The selection screen display control unit 134 causes the display unit 141 to display the generated selection screen. In addition, on the basis of a face group selection signal by the user input via the operating input unit 142, the selection screen display control unit 134 treats the user-selected face group as a first candidate face group, and supplies information about several high-ranking face groups to the face group configuration unit 135.

In one process, when there is a user selection, the face group configuration unit 135 configures the first candidate face group supplied from the selection screen display control unit 134 as the face group to associate with the specific name. In one process, when there is no user selection, the face group configuration unit 135 configures the first candidate face group supplied from the name/face group distance acquisition unit 133 as the face group to associate with the specific name.

The display unit 141 is made up of a liquid crystal display (LCD) or the like, for example, and displays a selection screen from the selection screen display control unit 134.

The operating input unit 142 is made up of a mouse and keyboard or a touch panel stacked onto or under the display unit 141, for example, and supplies a signal corresponding to a user operation to the selection screen display control unit 134. For example, a selection signal of a face group on the selection screen is supplied to the face group configuration unit 135 and the like via the selection screen display control unit 134.

[Example of Face Group Determination Process]

Figure 13:
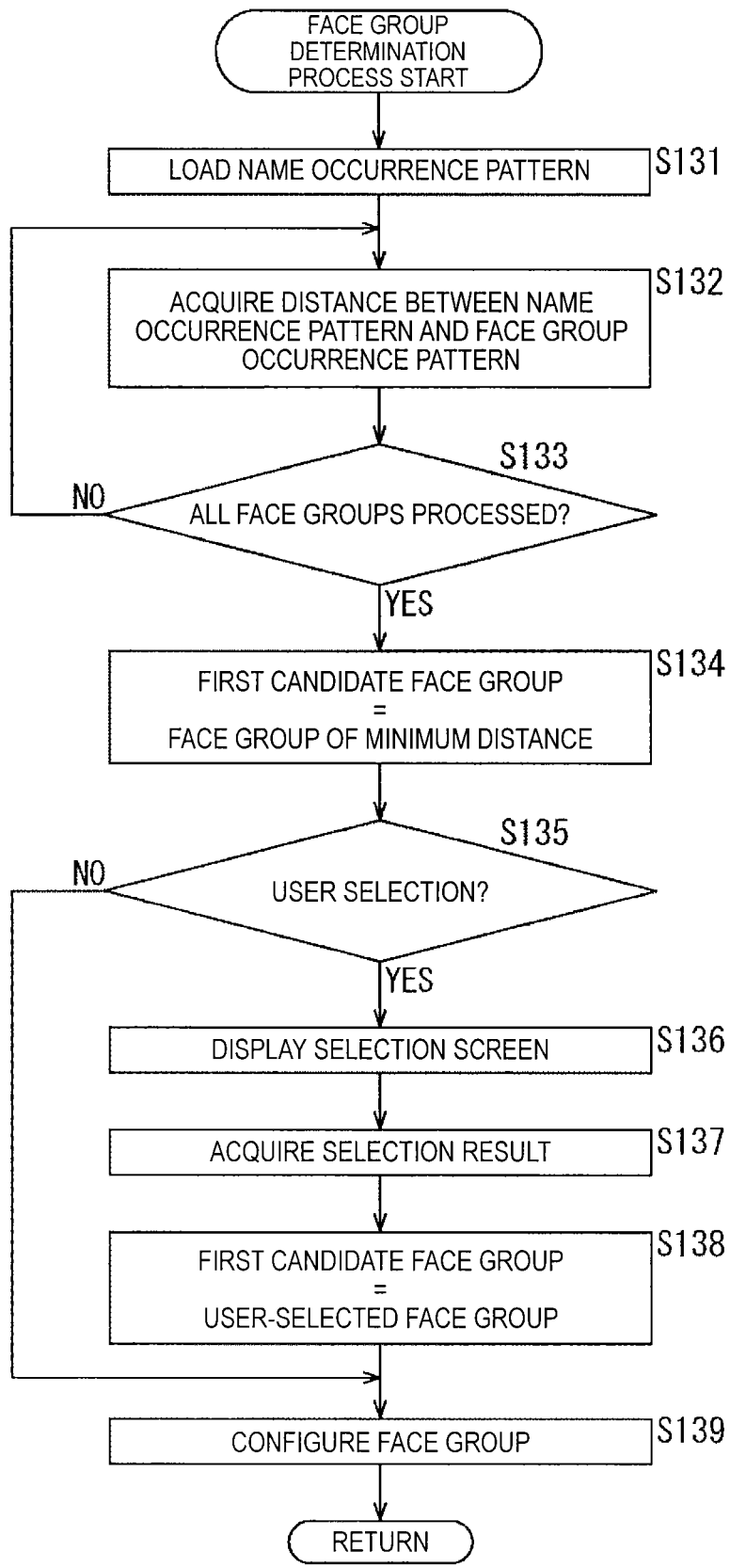
FIG. 13 is a flowchart describing another example of a face group determination process.

Next, the face group determination process in step S13 of FIG. 2 executed by the face group determination unit 25 of FIG. 12 will be described with reference to the flowchart in FIG. 13.

In step S131, the name occurrence pattern input unit 131 loads and supplies to the name/face group distance acquisition unit 133 a name occurrence pattern from the content selection unit 23. At this point, the face group occurrence pattern input unit 132 loads and supplies to the name/face group distance acquisition unit 133 face group occurrence patterns from the face group acquisition unit 24.

In step S132, the name/face group distance acquisition unit 133 acquires the distance of similarity between the name occurrence pattern from the name occurrence pattern input unit 131 and a face group occurrence pattern from the face group occurrence pattern input unit 132.

In step S133, the name/face group distance acquisition unit 133 determines whether or not all face groups have been processed. In the case of determining that not all face groups have been processed, the process returns to step S132 in step S133, and the processing thereafter is repeated.

In the case of determining that all face groups have been processed in step S133, the process proceeds to step S134. In step S134, the name/face group distance acquisition unit 133 treats the face group of minimum distance as a first candidate face group, and supplies information about several high-ranking face groups to the selection screen display control unit 134 and the face group configuration unit 135.

In step S135, in one process, the selection screen display control unit 134 determines whether or not there is a user selection. In the case of determining that there is a user selection in step S135, the process proceeds to step S136.

In step S136, the selection screen display control unit 134 generates a selection screen enabling the selection of one face group name from among candidate face group names made up of face group names that are candidates for the face group to associate with the name. Subsequently, the selection screen display control unit 134 causes the display unit 141 to display the generated selection screen.

The user operates the operating input unit 142 to select a face group name to associate with the name. The operating input unit 142 supplies a selection signal corresponding to the selection to the selection screen display control unit 134.

In step S137, the selection screen display control unit 134 acquires a selection result from the operating input unit 142. In step S138, the selection screen display control unit 134 treats the user-selected face group as a first candidate face group, and supplies information about several high-ranking face groups to the face group configuration unit 135.

On the other hand, in step S135, in the case of determining that there is no user selection, the process skips steps S136 to S138, and proceeds to step S139.

In step S139, the face group configuration unit 135 configures a face group. In other words, in one process, when there is a user selection, the face group configuration unit 135 configures the first candidate face group supplied from the selection screen display control unit 134 as the face group to associate with the specific name. In one process, when there is no user selection, the face group configuration unit 135 configures the first candidate face group supplied from the name/face group distance acquisition unit 133 as the face group to associate with the specific name.

Note that although the above describes an example of determining a face group in which several high-ranking face groups are treated as candidates and presented to the user for selection by the user, as described next, a selection may also be made using a network service or the like as external data.

[Exemplary Configuration of Face Group Determination Unit]

Figure 14:
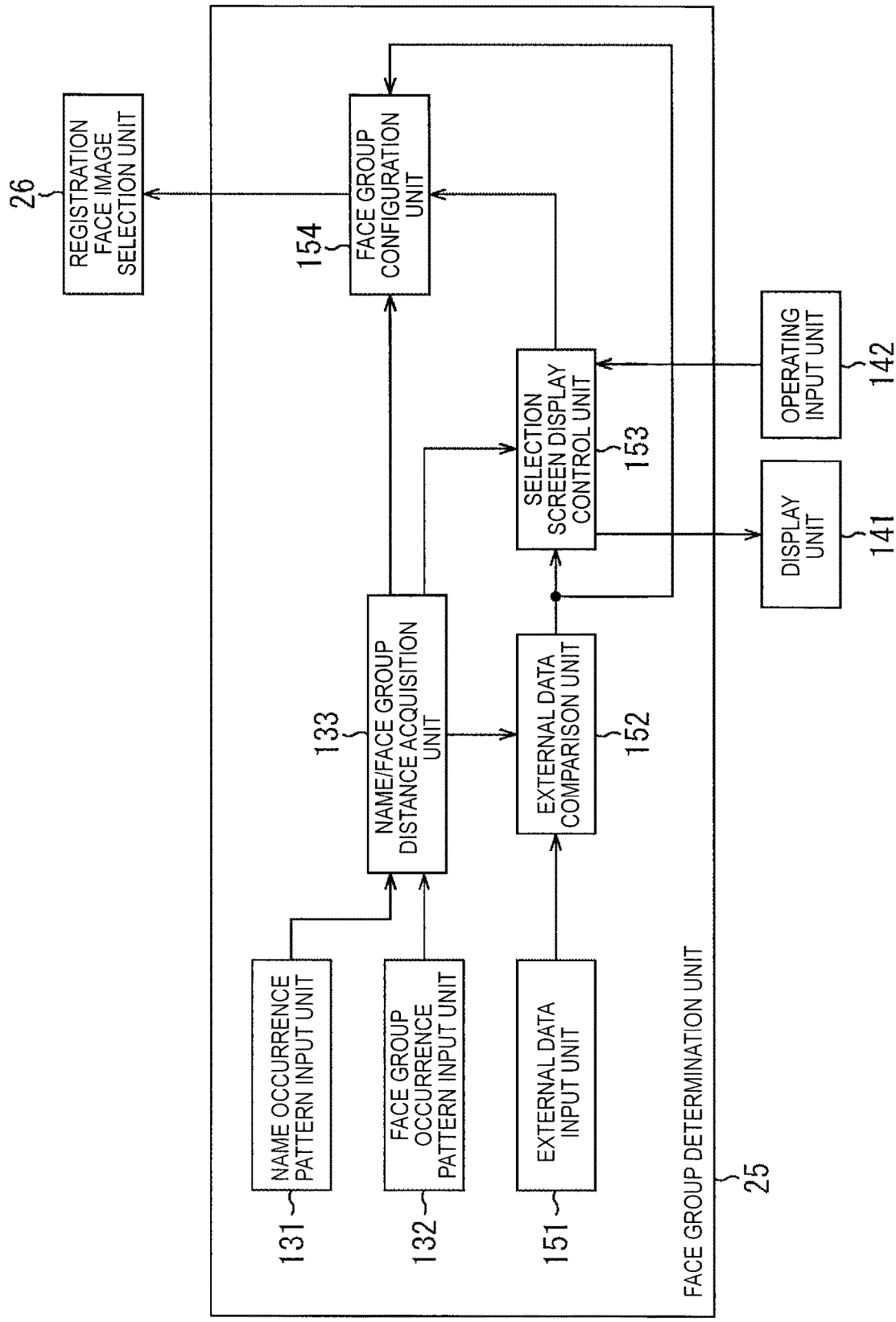
FIG. 14 is a block diagram illustrating another exemplary configuration of a face group determination unit.

FIG. 14 is a block diagram illustrating an exemplary configuration of a face group determination unit that makes a selection using a network service or the like as external data.

In the example of FIG. 14, the face group determination unit 25 includes a name occurrence pattern input unit 131, a face group occurrence pattern input unit 132, and a name/face group distance acquisition unit 133. Additionally, the face group determination unit 25 includes an external data input unit 151, an external data comparison unit 152, a selection screen display control unit 153, and a face group configuration unit 154.

The face group determination unit 25 of FIG. 14 is equipped with a name occurrence pattern input unit 131, a face group occurrence pattern input unit 132, and a name/face group distance acquisition unit 133, in common with the face group determination unit 25 of FIG. 12.

The face group determination unit 25 of FIG. 14 differs from the face group determination unit 25 of FIG. 12 in that the selection screen display control unit 134 and the face group configuration unit 135 are replaced with a selection screen display control unit 153 and a face group configuration unit 154. In addition, the face group determination unit 25 of FIG. 14 differs from the face group determination unit 25 of FIG. 12 with the addition of an external data input unit 151 and an external data comparison unit 152.

In other words, the name/face group distance acquisition unit 133 treats the face group of minimum distance as a first candidate face group, and supplies information about several high-ranking face groups to the external data comparison unit 152, the selection screen display control unit 153, and the face group configuration unit 154.

The external data input unit 151 inputs and supplies to the external data comparison unit 152 external data made up of face feature values and the like of several high-ranking image search results conducted by an external network service or the like for the same name as the one input into the name input unit 21 of FIG. 1.

The external data comparison unit 152 compares the face feature values of several high-ranking image search results conducted by an external network service or the like from the external data input unit 151 with representative face feature values of several high-ranking face groups of small distance from the name/face group distance acquisition unit 133. As a result of the comparison, the external data comparison unit 152 treats the face group with the highest degree of similarity with the external data as a first candidate face group, and supplies information about several high-ranking face groups to the selection screen display control unit 153 and the face group configuration unit 154.

In one process, when external data is used and there is a user selection, the selection screen display control unit 153 generates a selection screen made up of face group names and the like that are candidates for the face group to associate with the name, on the basis of the face group information from the external data comparison unit 152. In one process, when external data is not used and there is a user selection, the selection screen display control unit 153 generates a selection screen made up of face group names and the like that are candidates for the face group to associate with the name, on the basis of the face group information from the name/face group distance acquisition unit 133. The selection screen display control unit 153 causes the display unit 141 to display the generated selection screen.

On the basis of a face group selection signal by the user input via the operating input unit 142, the selection screen display control unit 153 treats the user-selected face group as a first candidate face group, and supplies information about several high-ranking face groups to the face group configuration unit 135.

In one process, when there is a user selection, the face group configuration unit 154 configures the first candidate face group supplied from the selection screen display control unit 153 as the face group to associate with the specific name. In one process, when external data is used and there is no user selection, the face group configuration unit 154 configures the first candidate face group supplied from the external data comparison unit 152 as the face group to associate with the specific name. In one process, when external data is not used and there is no user selection, the face group configuration unit 154 configures the first candidate face group supplied from the name/face group distance acquisition unit 133 as the face group to associate with the specific name.

[Another Example of Face Group Determination Process]

Figure 15:
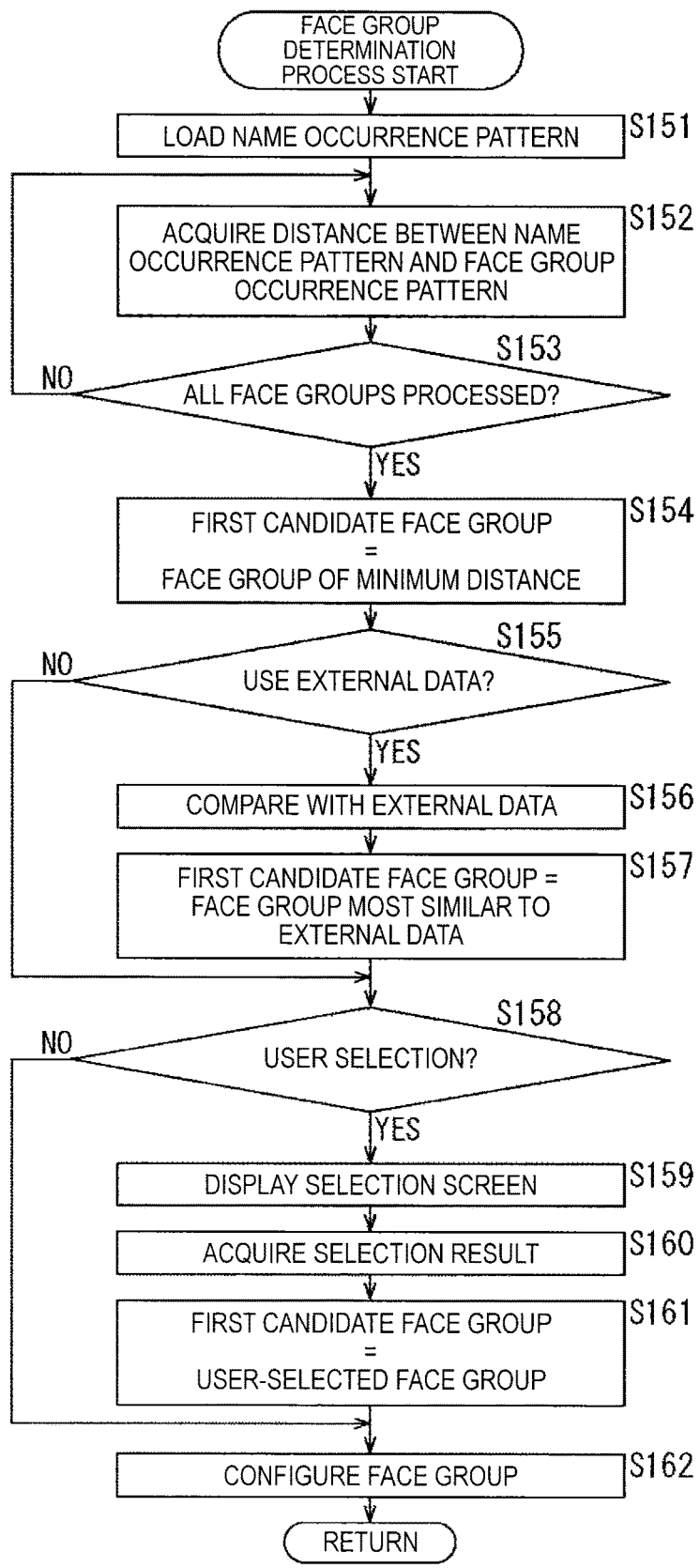
FIG. 15 is a flowchart describing yet another example of a face group determination process.

Next, the face group determination process in step S13 of FIG. 2 executed by the face group determination unit 25 of FIG. 14 will be described with reference to the flowchart in FIG. 15.

In step S151, the name occurrence pattern input unit 131 loads and supplies to the name/face group distance acquisition unit 133 a name occurrence pattern from the content selection unit 23. At this point, the face group occurrence pattern input unit 132 loads and supplies to the name/face group distance acquisition unit 133 face group occurrence patterns from the face group acquisition unit 24.

In step S152, the name/face group distance acquisition unit 133 acquires the distance of similarity between the name occurrence pattern from the name occurrence pattern input unit 131 and a face group occurrence pattern from the face group occurrence pattern input unit 132.

In step S153, the name/face group distance acquisition unit 133 determines whether or not all face groups have been processed. In the case of determining that not all face groups have been processed in step S153, the process returns to step S152, and the processing thereafter is repeated.

In the case of determining that all face groups have been processed in step S153, the process proceeds to step S154. In step S154, the name/face group distance acquisition unit 133 treats the face group of minimum distance as a first candidate face group, and supplies information about several high-ranking face groups to the external data comparison unit 152, the selection screen display control unit 153, and the face group configuration unit 154.

In step S155, in one process, the external data comparison unit 152 determines whether or not to use external data. In the case of determining to use external data in step S155, the process proceeds to step S156.

In step S156, the external data comparison unit 152 conducts a process of comparing several high-ranking face groups of small distance from the name/face group distance acquisition unit 133 with external data from the external data input unit 151. In other words, the external data comparison unit 152 compares the face feature values of several high-ranking image search results conducted by an external network service or the like from the external data input unit 151 with representative face feature values of several high-ranking face groups of small distance from the name/face group distance acquisition unit 133.

In step S157, as a result of the comparison, the external data comparison unit 152 treats the face group with the highest degree of similarity with the external data as a first candidate face group, and supplies information about several high-ranking face groups to the selection screen display control unit 153 and the face group configuration unit 154.

In addition, in the case of determining to not use external data in step S155, the process skips steps S156 and S157, and proceeds to step S158.

In step S158, in one process, the selection screen display control unit 153 determines whether or not there is a user selection. In the case of determining that there is a user selection in step S158, the process proceeds to step S159.

In step S159, the selection screen display control unit 153 generates a selection screen enabling the selection of one face group name from among candidate face group names made up of face group names that are candidates for the face group to associate with the name. The selection screen display control unit 153 causes the display unit 141 to display the generated selection screen.

Note that in one process, when external data is used and there is a user selection, the selection screen display control unit 153 generates a selection screen made up of face group names and the like that are candidates for the face group to associate with the name, on the basis of the face group information from the external data comparison unit 152. In one process, when external data is not used and there is a user selection, the selection screen display control unit 153 generates a selection screen made up of face group names and the like that are candidates for the face group to associate with the name, on the basis of the face group information from the name/face group distance acquisition unit 133.

The user operates the operating input unit 142 to select a face group name to associate with the name. The operating input unit 142 supplies a selection signal corresponding to the selection to the selection screen display control unit 153.

In step S160, the selection screen display control unit 153 acquires a selection result from the operating input unit 142. In step S161, the selection screen display control unit 153 treats the user-selected face group as a first candidate face group, and supplies information about several high-ranking face groups to the face group configuration unit 154.

In step S158, in the case of determining that there is no user selection, the process skips steps S159 to S161, and proceeds to step S162.

In step S162, the face group configuration unit 154 configures a face group. In other words, in one process, when there is a user selection, the face group configuration unit 154 configures the first candidate face group supplied from the selection screen display control unit 153 as the face group to associate with the specific name. In one process, when external data is used and there is no user selection, the face group configuration unit 154 configures the first candidate face group supplied from the external data comparison unit 152 as the face group to associate with the specific name. In one process, when external data is not used and there is no user selection, the face group configuration unit 154 configures the first candidate face group supplied from the name/face group distance acquisition unit 133 as the face group to associate with the specific name.

As above, in the information processing device 11 of FIG. 1, a name occurrence pattern indicating whether or not a user-specified name occurs within selected content is acquired, and face group occurrence patterns indicating occurrence or non-occurrence in all selected content are acquired. Subsequently, on the basis of the similarity between the name occurrence pattern and the face group occurrence patterns, a face group to associate with the user-specified name is determined. Consequently, more efficient name registration work is possible.

2. Embodiment (Information Processing Device)

[Another Configuration of Information Processing Device According to Present Technology]

Figure 16:
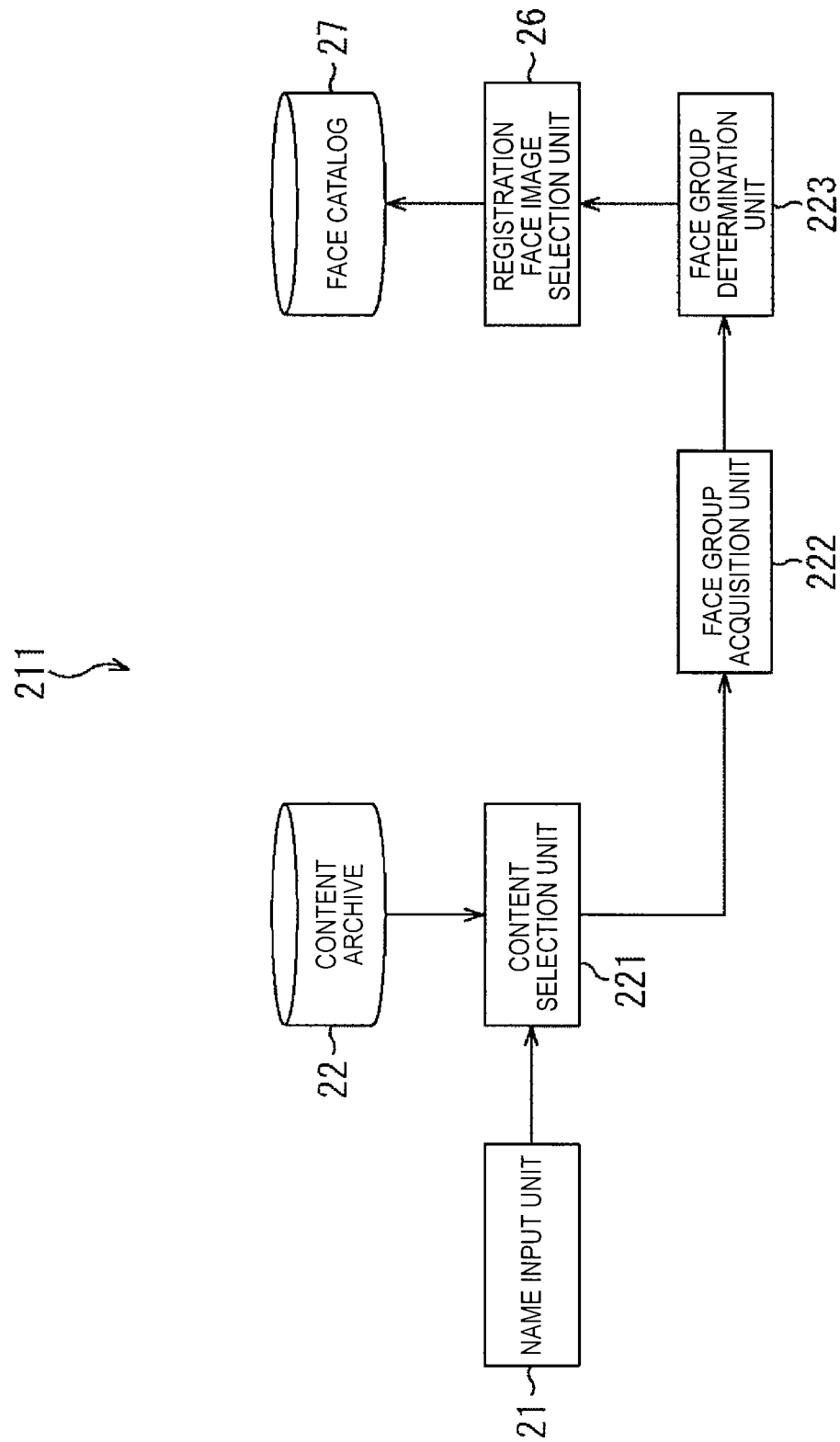
FIG. 16 is a block diagram illustrating another exemplary configuration of an information processing device applying the present technology.

FIG. 16 is a diagram illustrating an exemplary configuration of an information processing device applying the present technology.

As an example, as in the information processing device 11 in FIG. 1, the information processing device 211 in FIG. 16 registers in a catalog a face image and a face image feature value corresponding to a name, and conducts searches on the catalog, even if the input name is not registered in the catalog. As in the information processing device 11, the information processing device 211 is made up of a personal computer or the like, for example.

In the example of FIG. 16, the information processing device 211 includes the name input unit 21, the content archive 22, a content selection unit 221, a face group acquisition unit 222, a face group determination unit 223, the registration face image selection unit 26, and the face catalog 27.

The information processing device 211 is equipped with a name input unit 21, a content archive 22, a registration face image selection unit 26, and a face catalog 27, in common with the information processing device 11 of FIG. 1. The information processing device 211 differs from the information processing device 11 of FIG. 1 in that the content selection unit 23, the face group acquisition unit 24, and the face group determination unit 25 are replaced with a content selection unit 221, a face group acquisition unit 222, and a face group determination unit 223, respectively.

In other words, the content selection unit 221 selects, from inside the content archive 22, content in which the name specified from the name input unit 21 or the specific person possibly occur. Herein, the selected content is taken to be content within a specified range inside the content archive 22. For example, the target of selection may be limited by the category of picture, capture time, capture location, or the like.

The content selection unit 221 supplies information about the selected content to the face group acquisition unit 222.

The face group acquisition unit 222 conducts a process that groups faces occurring within each piece of content selected by the content selection unit 221, and collects the same person into a single group. Subsequently, the face group acquisition unit 222 conducts a process of acquiring, as candidate face groups, face groups with a high likelihood of the specific person from among all face groups in all selected content. Specifically, the face group acquisition unit 222 acquires, from among the face groups of the selected content, as candidate face groups, face groups that have the greatest number of similar face groups appearing in other content. The face group acquisition unit 222 supplies information about the acquired candidate face groups to the face group determination unit 223.

The face group determination unit 223 conducts a process of determining a face group to associate with the specific person from among the candidate face groups acquired by the face group acquisition unit 222. Specifically, the face group determination unit 223 clusters the candidate face groups, and determines the face group belonging to the cluster with the most candidate face groups as the face group to associate with the name. The face group determination unit 223 supplies information about the determined face group to the registration face image selection unit 26.

[Operation of Information Processing Device]

Figure 17:
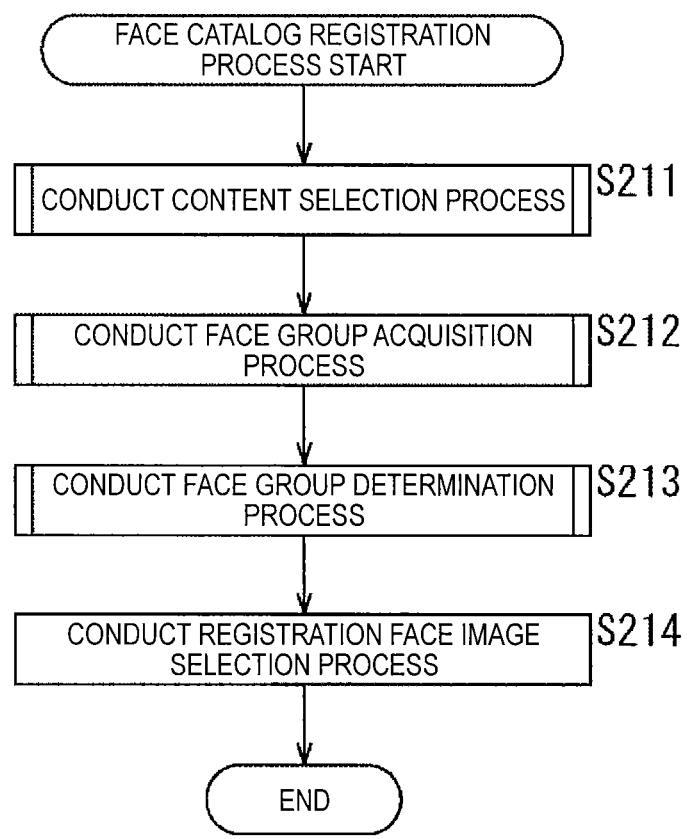
FIG. 17 is a flowchart describing a face catalog registration process of an information processing device.

Next, a face catalog registration process which is an operation of the information processing device 211 will be described with reference to the flowchart in FIG. 17.

For example, a name specified by the user is input into the content selection unit 221 via the name input unit 21. In step S211, the content selection unit 221 conducts a content selection process. The content selection process will be described later in detail with reference to FIG. 18.

According to the process in step S211, content in which the specific person possibly occurs is selected from inside the content archive 22, and supplied together with the content to the face group acquisition unit 222.

In step S212, the face group acquisition unit 222 conducts a face group acquisition process. The face group acquisition process will be described later in detail with reference to FIG. 21.

According to the process in step S212, face images occurring in each piece of selected content are detected and grouped per person, and only the face groups that possibly correspond to the specific person are acquired as candidate face groups and supplied to the face group determination unit 223.

In step S213, the face group determination unit 223 conducts a face group determination process. The face group determination process will be described later in detail with reference to FIG. 26.

According to the process in step S213, a face group to associate with the specific name is determined from among the collection of candidate face groups acquired by the face group acquisition unit 222. Information about the determined face group is supplied to the registration face image selection unit 26.

In step S214, the registration face image selection unit 26 conducts a registration face image selection process. In other words, the registration face image selection unit 26 selects a specified number of face images and face image feature values from among the face group determined by the face group determination unit 25, and registers in the face catalog 27 the selected face images and face image feature values in association with the name.

According to the above, in the information processing device 211, face images and face image feature values are registered in the face catalog 27 in association with a name, enabling searches to be conducted. Consequently, more efficient catalog registration work is possible.

[Example of Content Selection Process]

Figure 18:
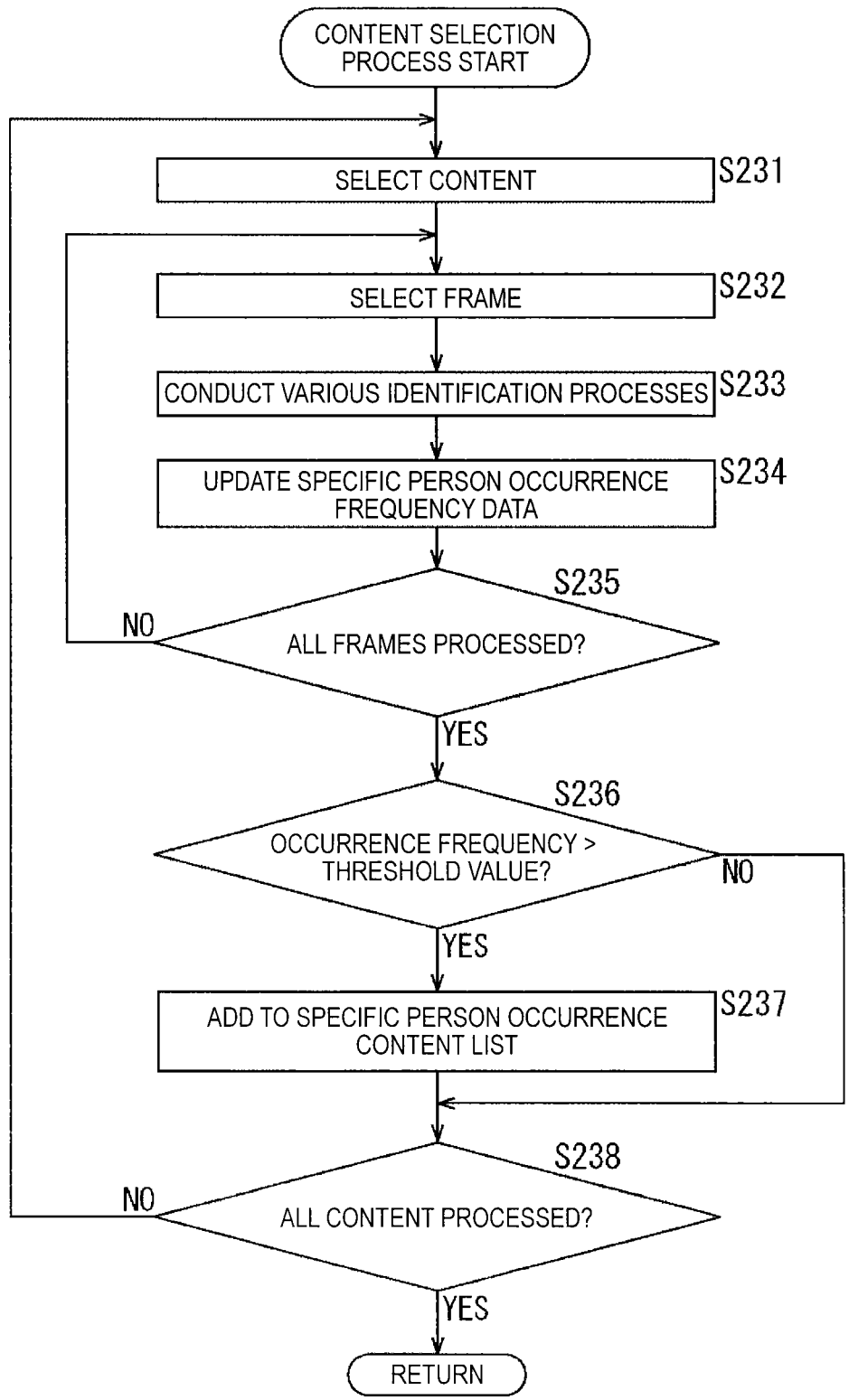
FIG. 18 is a flowchart describing a content selection process.

Next, the content selection process in step S211 of FIG. 17 will be described with reference to the flowchart in FIG. 18. In the content selection process, content in which the specific person possibly occurs is acquired from inside the content archive 22.

The content selection unit 221 selects content from the content archive 22 in step S231, and selects a frame in step S232.

In step S233, the content selection unit 221 conducts various identification processes on the selected frame. Note that in step S233, processes basically similar to the identification processes conducted in step S33 of FIG. 4 are conducted. In other words, in steps S232 and S233, at an arbitrary time interval, metadata attached to the content is read, and the various identification processes judge whether or not the specific name or speech by the specific person occurs.

Herein, an identification process refers to a process of identifying text information in a screen, and may be a process of identifying spoken content, and additionally is a process using text, speech, or other information in a picture, such as a process of identifying a speaker. Consequently, the identification process is not required to be limited to the above, insofar as it is possible to acquire text information or audio information related to the specific name and identify whether or not the specific person is present.

In step S234, every time the above identification processing is conducted, the content selection unit 221 updates specific person occurrence frequency data as a result. For example, the specific person occurrence frequency data is structured as discussed earlier with reference to FIG. 5. The details written to the specific person occurrence frequency data are a time position at which identification was conducted, and information indicating whether or not there is an occurrence. Herein, the information indicating whether or not there is an occurrence may be included for every identification processing result, collected into a single piece of information, or both. In addition, information such as the size of the text and the volume of speech at the time of identification may also be written.

In step S235, the content selection unit 221 determines whether or not all frames have been processed. In the case of determining that not all frames have been processed in step S235, the process returns to step S232, and the processing thereafter is repeated.

In step S235, in the case of determining that all frames have been processed, the process proceeds to step S236. In step S236, the content selection unit 221 determines whether or not the occurrence frequency is greater than a threshold value, on the basis of the updated specific person occurrence frequency data.

In step S236, in the case of determining that the occurrence frequency is greater than the threshold value, the specific person is treated as occurring, and the process proceeds to step S237. In step S237, the content selection unit 221 adds the content selected in step S231 to a specific person occurrence content list.

In step S236, in the case of determining that the occurrence frequency is less than the threshold value, the operation in step S237 is skipped, and the process proceeds to step S238.

Note that in step S236 discussed above, the determination of whether or not the specific person occurs may be made with not only the occurrence frequency, but also in combination with factors such as the size of the text and the volume of speech at the time of identification.

In step S238, the content selection unit 221 determines whether or not the above process has been conducted on all content. In the case of determining that not all content has been processed in step S238, the process returns to step S231, and the processing thereafter is repeated. In the case of determining that all content has been processed in step S238, the content selection process of FIG. 18 ends. Subsequently, information about the content in the specific person occurrence content list is supplied to the face group acquisition unit 222 as information about the selected content.

Note that an example is described in which the identification processing in the content selection process described above is conducted every time a name is specified. However, the identification processing is not required to be conducted every time a name is specified. In other words, information related to a person occurring in a piece of content and the frequency of occurrence may be acquired in advance for each piece of content and stored in memory or the like, for example, and on the basis of the information, the name occurrence pattern may be updated. An example of the content selection process in this case is illustrated in the following FIG. 19.

[Another Example of Content Selection Process]

Figure 19:
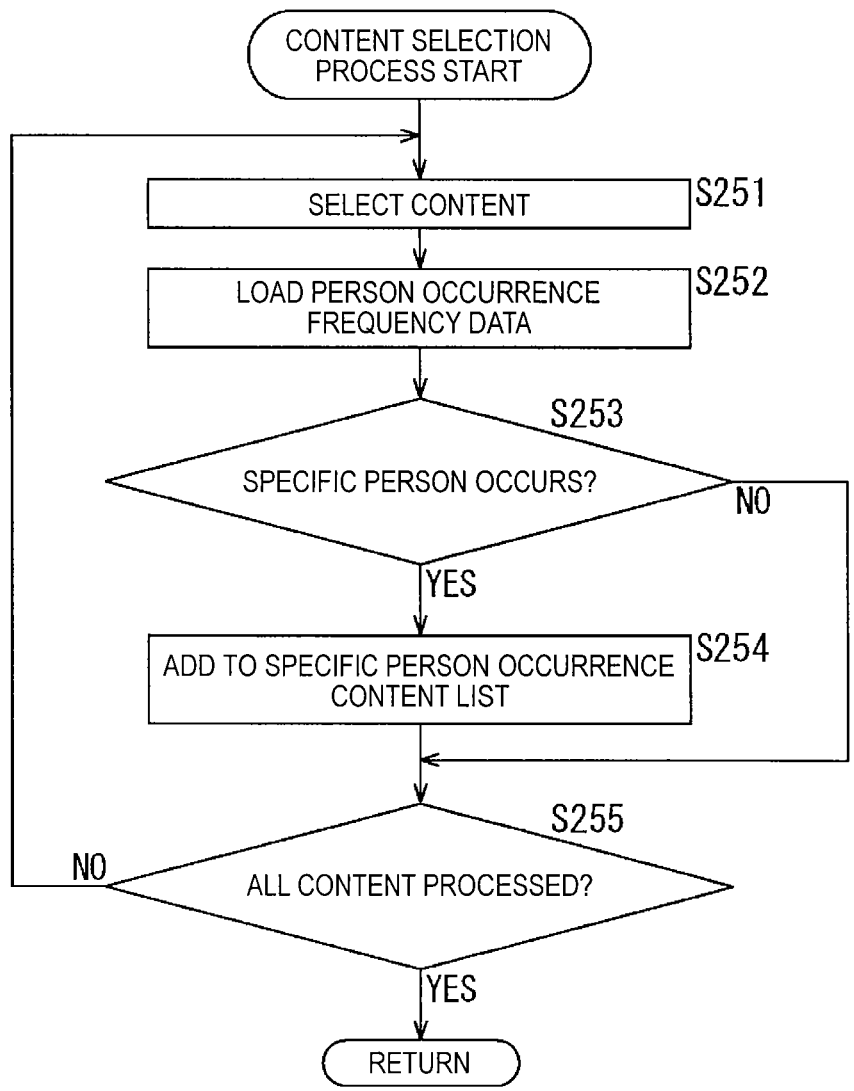
FIG. 19 is a flowchart describing another example of a content selection process.

Next, another example of the content selection process in step S211 of FIG. 17 will be described with reference to the flowchart in FIG. 19.

In step S251, the content selection unit 221 selects one piece of content from the content archive 22. In step S252, the content selection unit 23 loads name occurrence frequency data for the acquired content from memory (not illustrated) or the like, for example. For example, the person occurrence frequency data is structured as discussed earlier with reference to FIG. 7.

In step S253, the content selection unit 23 determines whether or not the specific person occurs. For example, similarly to step S236 of FIG. 18, by determining whether or not the occurrence frequency is greater than a threshold value, it is determined whether or not the specific person occurs.

In step S253, in the case of determining that the occurrence frequency is greater than the threshold value, or in other words, that the specific person occurs, the process proceeds to step S254. In step S254, the content selection unit 23 adds the content selected in step S251 to a specific person occurrence content list.

In step S253, in the case of determining that the occurrence frequency is less than the threshold value, or in other words, that the specific person does not occur, the process skips step S254 and proceeds to step S255.

In step S255, the content selection unit 221 determines whether or not the above process has been conducted on all content. In the case of determining that not all content has been processed in step S255, the process returns to step S251, and the processing thereafter is repeated. In the case of determining that all content has been processed in step S255, the content selection process of FIG. 19 ends. Subsequently, information about the content in the specific person occurrence content list is supplied to the face group acquisition unit 222 as information about the selected content.

[Exemplary Configuration of Face Group Acquisition Unit]

Figure 20:
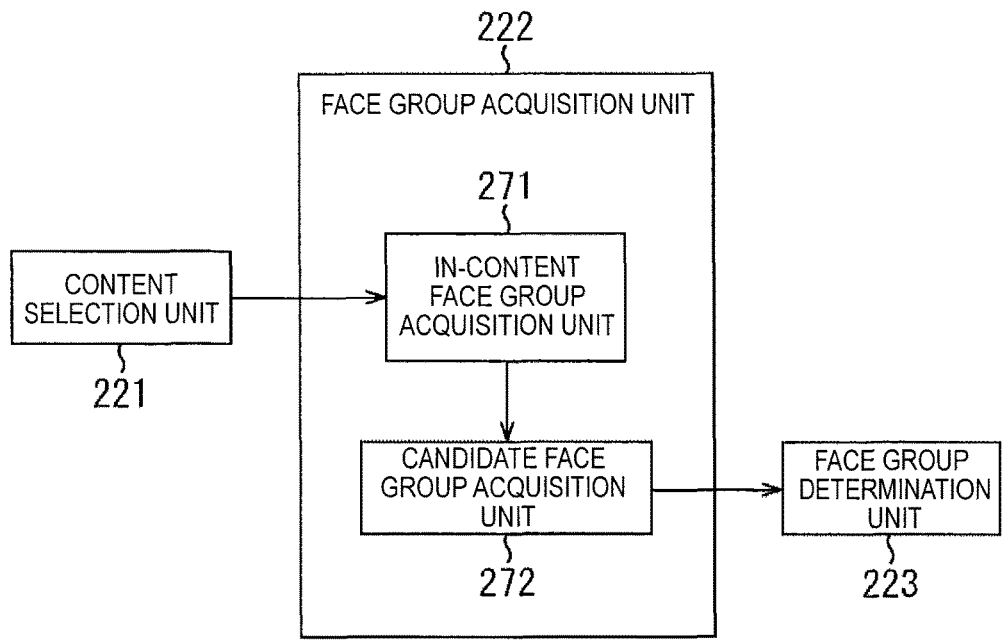
FIG. 20 is a block diagram illustrating an exemplary configuration of a face group acquisition unit.

FIG. 20 illustrates an exemplary configuration of a face group acquisition unit.

In the example of FIG. 20, the face group acquisition unit 222 includes an in-content face group acquisition unit 271 and a candidate face group acquisition unit 272.

The in-content face group acquisition unit 271 detects face images occurring in each piece of content selected by the content selection unit 221 (in other words, each piece of content in the specific person occurrence content list), and groups the face images per person. Subsequently, the in-content face group acquisition unit 271 acquires only face groups that possibly correspond to the specific person. In other words, face groups that are not the specific person are excluded. The in-content face group acquisition unit 271 supplies information about the acquired face groups to the candidate face group acquisition unit 272.

The candidate face group acquisition unit 272 acquires candidates for the face group to associate with the specific person (hereinafter designated candidate face groups) for each piece of content, and supplies information about the acquired candidate face groups to the face group determination unit 223.

[Example of Face Group Acquisition Process]

Next, the face group acquisition process in step S212 of FIG. 17 will be described with reference to the flowchart in FIG. 21.

In step S271, the in-content face group acquisition unit 271 conducts an in-content face group acquisition process. The in-content face group acquisition process will be described later in detail with reference to FIG. 22.

According to the process in step S271, face images occurring in each piece of content selected by the content selection unit 221 are detected and grouped per person, and only face groups that possibly correspond to the specific person are acquired.

In step S272, the in-content face group acquisition unit 271 determines whether or not the process of step S271 has been conducted on all content. In step S272, in the case of determining that not all content has been processed, the process returns to step S271, and the processing thereafter is repeated.

In step S272, in the case of determining that all content has been processed, the process proceeds to step S273. In step S273, the candidate face group acquisition unit 272 conducts a candidate face group acquisition process. The candidate face group acquisition process will be described later with reference to FIG. 24.

According to the process of step S273, candidates for the face group to associate with the specific person are acquired for each piece of content, and information about the acquired candidate face groups is supplied to the face group determination unit 223. Subsequently, the face group acquisition process of FIG. 21 ends, and the process returns to step S212 of FIG. 17.

[Example of In-Content Face Group Acquisition Process]

Next, the in-content face group acquisition process in step S271 of FIG. 21 will be described with reference to the flowchart in FIG. 22.

In step S291, the in-content face group acquisition unit 271 conducts a face grouping process. Note that since the face grouping process is basically similar to the face grouping process discussed earlier with reference to FIG. 10, further description thereof would be a repetition, and is thus omitted.

According to the process in step S291, face images occurring within the content are detected, the detected face images are grouped per person, and the face groups are registered in a face group list. Note that this process is conducted on all content selected by the content selection unit 221.

In step S292, the in-content face group acquisition unit 271 conducts scene division. In other words, the in-content face group acquisition unit 271 divides the content at scene breaks.

In step S293, the in-content face group acquisition unit 271 configures one scene interval from among the divided scene intervals, and in step S294, determines whether or not a face appears in the configured scene interval. In step S294, in the case of determining that a face appears, the process proceeds to step S295.

In step S295, the in-content face group acquisition unit 271 loads the specific person occurrence frequency data of the scene interval configured in step S293. In other words, data of the relevant scene interval is loaded from among the specific person occurrence frequency data acquired by the content selection unit 221.

In step S296, it is determined whether or not the specific person does not occur in a nearby scene including the relevant scene interval. In step S296, in the case of determining that the specific person does not occur in a nearby scene including the relevant scene interval, the process proceeds to step S297.

In this case, since there is an extremely low likelihood that a face occurring in the relevant scene is the specific person, in step S297, the in-content face group acquisition unit 271 removes the face occurring in the relevant scene interval from the face group list. Consequently, face images occurring in a scene in which the specific person does not occur may be removed from the candidates.

On the other hand, in step S296, in the case of determining that the specific person occurs in a nearby scene including the relevant scene interval, there is a high likelihood that a face occurring in the relevant scene is the specific person, and thus the process skips step S297 and proceeds to step S298.

In addition, in step S294, in the case of determining that a face does not appear, the process skips steps S295 to S297, and proceeds to step S298.

In step S298, the in-content face group acquisition unit 271 determines whether or not the above process has been conducted on all scenes. In step S298, in the case of determining that the above process has not been conducted on all scenes, the process returns to step S293, and the processing thereafter is repeated.

In step S298, in the case of determining that the above process has been conducted on all scenes, the process proceeds to step S299.

In step S299, the in-content face group acquisition unit 271 selects one face group from the face group list, and conducts personal identification per face group. Subsequently, in step S300, the in-content face group acquisition unit 271 determines whether or not a face belonging to that face group matches the face of a person already registered in the catalog.

In step S300, in the case of determining that a face belonging to the face group matches the face of a person already registered in the catalog, the process proceeds to step S301. In this case, since the face group is clearly not of a face that should be associated with the specific person input from the name input unit 21, in step S301, the in-content face group acquisition unit 271 removes that face group from the face group list.

In addition, in step S300, in the case of determining that a face belonging to the face group does not match the face of a person already registered in the catalog, the process proceeds to step S302. In other words, in this case, the in-content face group acquisition unit 271 keeps the face group in the face group list, and in step S302, acquires a representative face image within the face group. The representative face image is taken to be an average face of the face feature values for all faces within the face group.

After that, in step S303, the in-content face group acquisition unit 271 determines whether or not the above process has been conducted on all face groups. In step S303, in the case of determining that the above process has not been conducted on all face groups, the process returns to step S299, and the processing thereafter is repeated.

Figure 21:
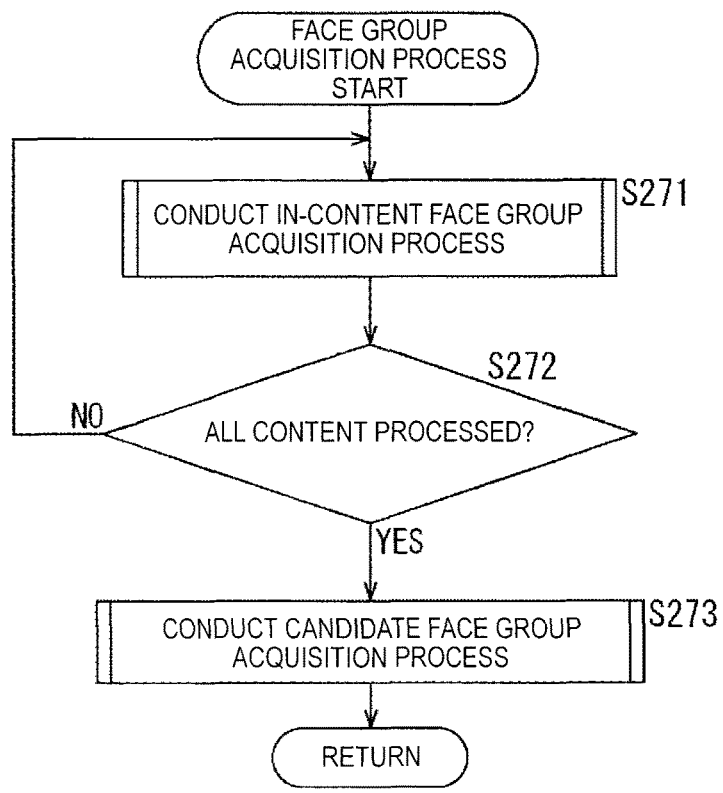
FIG. 21 is a flowchart describing a face group acquisition process.
Figure 22:
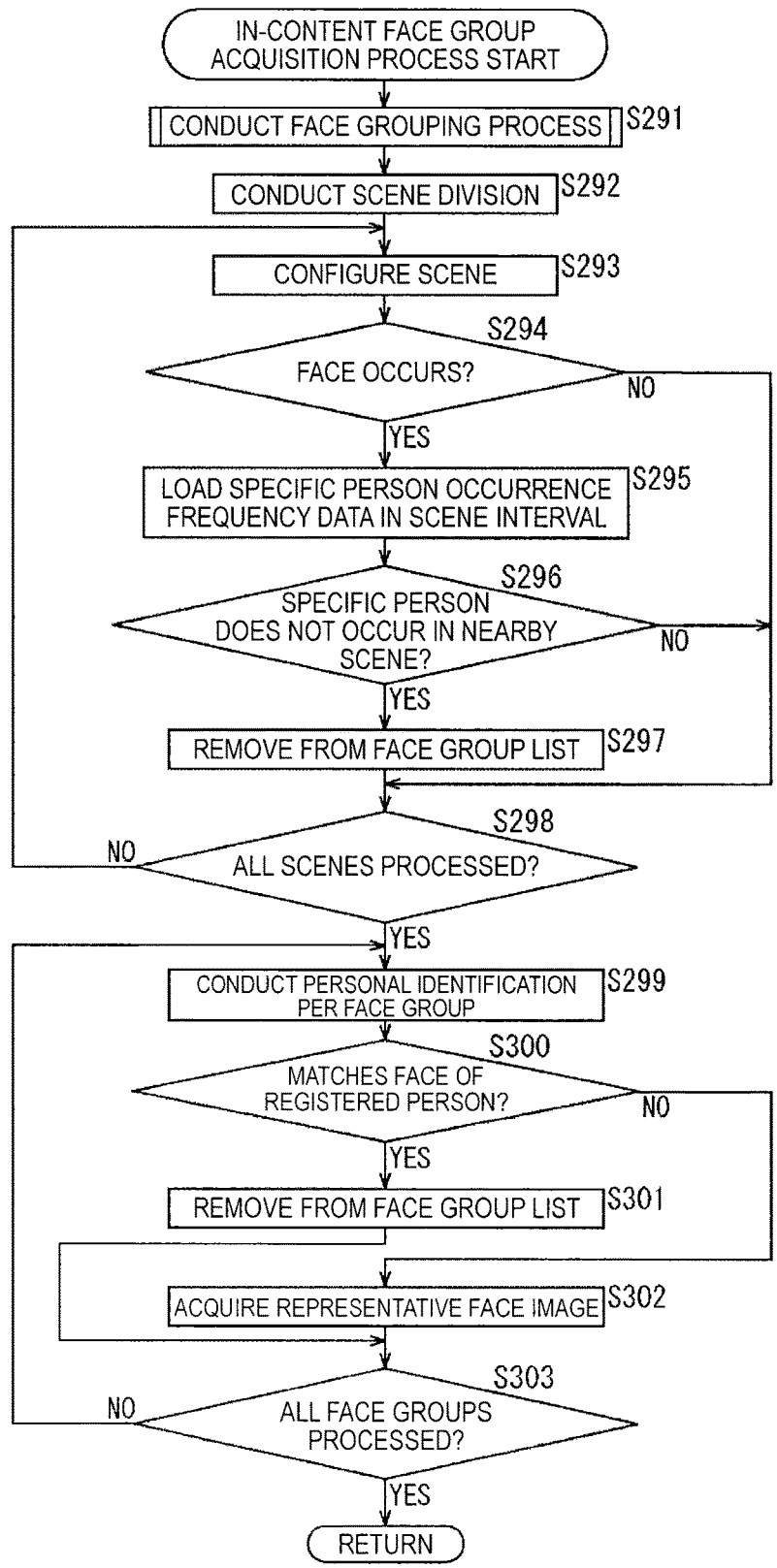
FIG. 22 is a flowchart describing an in-content face group acquisition process.

In step S303, in the case of determining that the above process has been conducted on all face groups, the in-content face group acquisition process of FIG. 22 ends, and the process returns to step S271 in FIG. 21.

As above, within each piece of content, face groups are created and registered in a face group list. Subsequently, groups of face images that occur in scenes in which the specific person does not occur and face groups that are not of a face that should be associated with the specific person are removed from the face group list. Subsequently, as a result, within each piece of content, a face group list made up of face groups that should be associated with the specific person is acquired.

[Example of Candidate Face Group Acquisition Process]

Next, the candidate face group acquisition process in step S273 of FIG. 21 will be described with reference to the flowchart in FIG. 23. Note that the example of FIG. 23 will be described with reference to FIG. 24 where appropriate.

Figure 24:
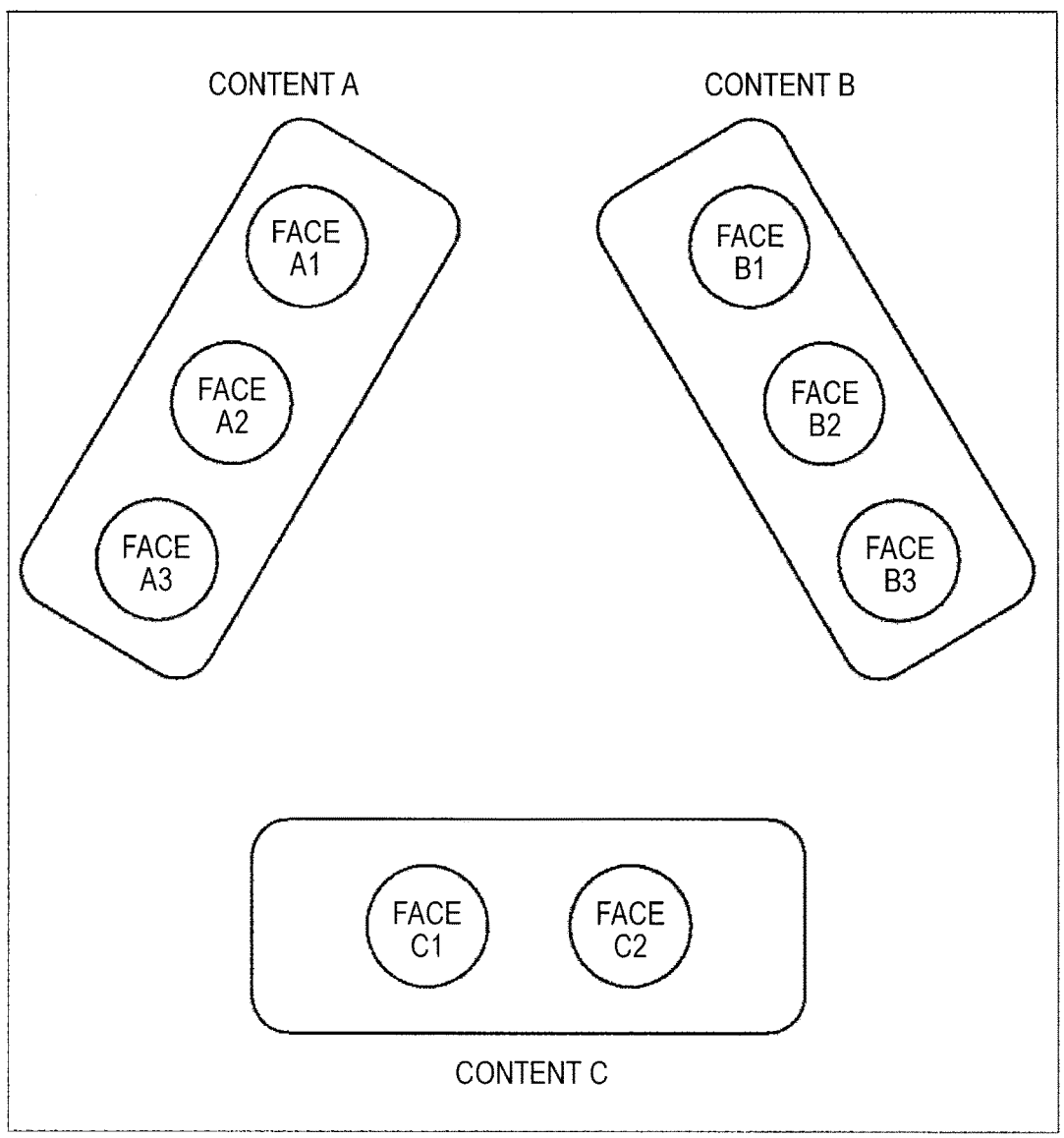
FIG. 24 is a diagram describing a candidate face group acquisition process.

For example, as illustrated in FIG. 24, content A to C is acquired as content in which the specific person occurs, and as a result of face grouping for each piece of content, in the content A, face groups A1 to A3 are acquired. In the content B, face groups B1 to B3 are acquired. Also, in the content C, face groups C1 and C2 are acquired.

In step S331, the candidate face group acquisition unit 272 selects a piece of content (for example, the content A). In step S332, the candidate face group acquisition unit 272 selects a face group (for example, the face group A1) from the face group list of the selected content.

In step S333, the candidate face group acquisition unit 272 acquires, from the face group lists of other pieces of content, the number of similar face groups appearing in the other pieces of content. Note that the representative image of each face group may also be used to compute the similarity between face groups. For example, similarity is evaluated between the face group A1 of the content A, and each of the face groups B1 to B3, C1, and C2 belonging to the content B and C other than the content A, and the number of times the similarity meets or exceeds a threshold value is acquired as a similarity group count $N_{A1}$.

In step S334, the candidate face group acquisition unit 272 determines whether or not all face groups in the selected piece of content have been processed. In step S334, in the case of determining that not all face groups have been processed, the process returns to step S332, and the processing thereafter is repeated.

In other words, a similar process is conducted on the other face groups A2 and A3 other than the content A, and similar face group counts $N_{A2}$ and $N_{A3}$ are acquired.

In step S334, in the case of determining that all face groups have been processed, the process proceeds to step S335. In step S335, the candidate face group acquisition unit 272 adds the face group with the greatest similarity face group count to a candidate face group.

In other words, the face group having the maximum value from among all similar face group counts $N_{A1}$ to $N_{A3}$ is acquired as a candidate face group. At this point, if there are multiple maximum values of the similar face group count, the multiple face groups having the maximum value are acquired as candidate face groups.

In step S336, the candidate face group acquisition unit 272 determines whether or not all content has been processed. In step S336, in the case of determining that not all content has been processed, the process returns to step S331, and the processing thereafter is repeated.

In other words, the above process is also conducted on the content B and C, and candidate face groups are acquired from all pieces of content.

Figure 23:
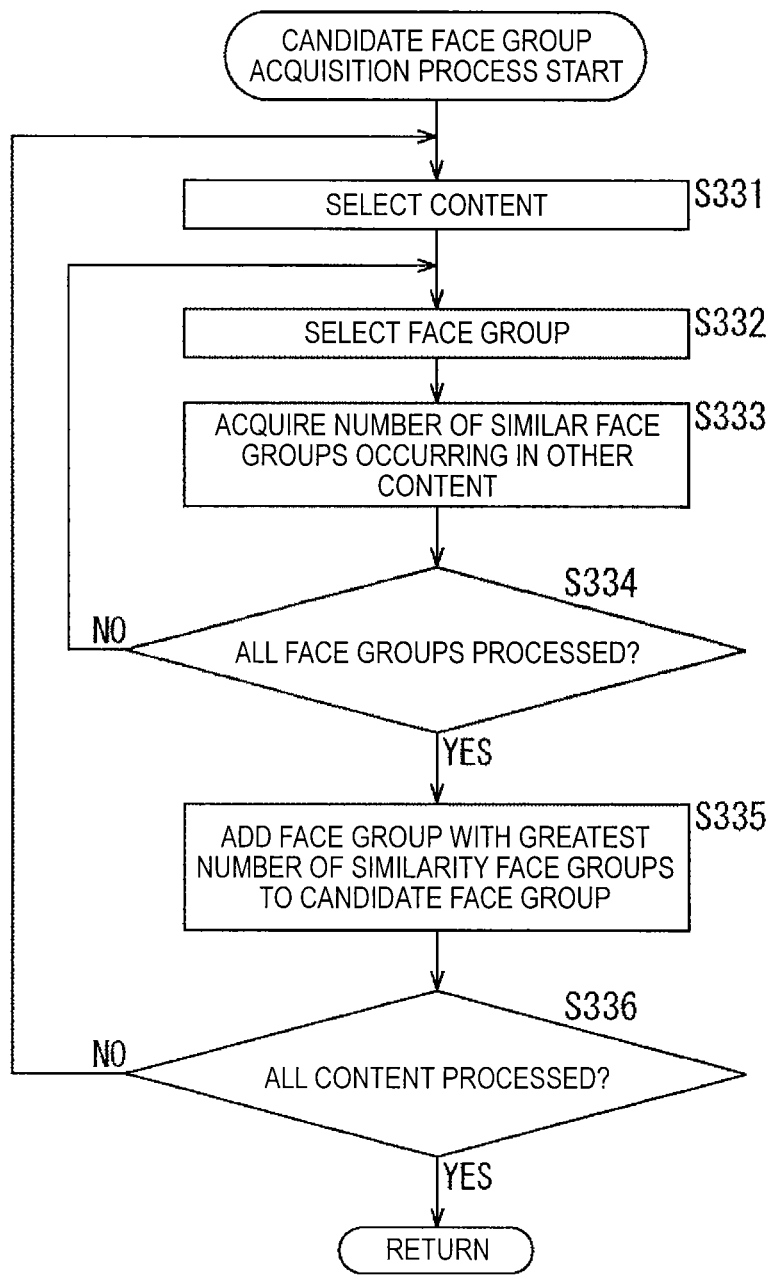
FIG. 23 is a flowchart describing a candidate face group acquisition process.

On the other hand, in step S336, in the case of determining that the above process has been conducted on all content, the candidate face group acquisition process of FIG. 23 ends, and the process returns to step S273 in FIG. 21.

As above, for every face group in each piece of content, a count of the number of similar face groups appearing in other content is acquired, and the face group with the greatest acquired similarity face group count is added to a candidate face group.

[Exemplary Configuration of Face Group Determination Unit]

Figure 25:
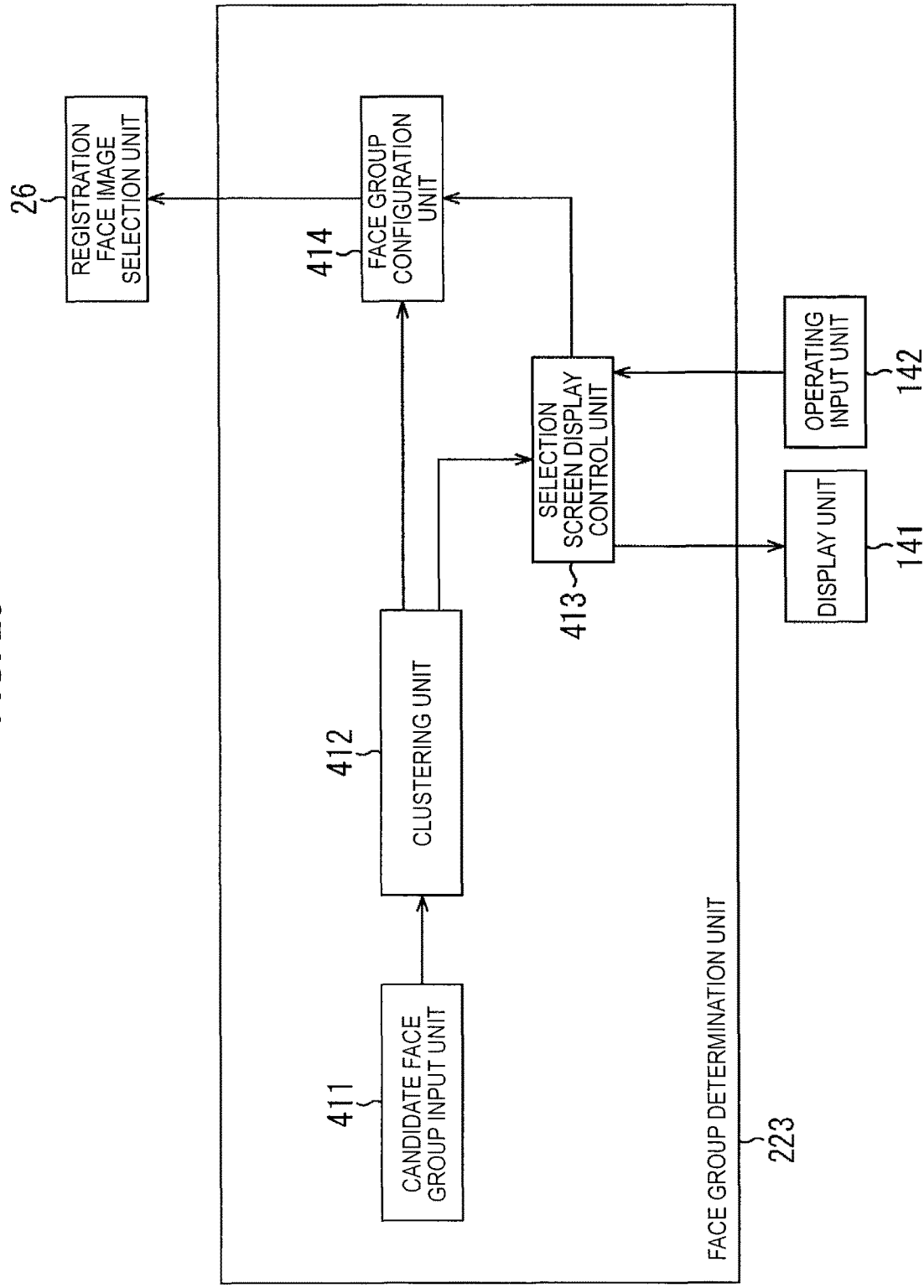
FIG. 25 is a block diagram illustrating an exemplary configuration of a face group determination unit.

FIG. 25 illustrates an exemplary configuration of a face group acquisition unit.

In the example of FIG. 25, the face group determination unit 223 includes a candidate face group input unit 411, a clustering unit 412, a selection screen display control unit 413, and a face group configuration unit 414.

Also, in this case, the information processing device 11 also includes the display unit 141 and the operating input unit 142 discussed with reference to FIG. 12 in addition to the configuration discussed earlier with reference to FIG. 16.

The candidate face group input unit 411 inputs and supplies to the clustering unit 412 a candidate face group of each piece of content from the candidate face group acquisition unit 272.

The clustering unit 412 conducts clustering using the face feature values of the representative face image of each candidate face group, and collects the faces of the same person into a single cluster.

For the clustering, a method is used in which clusters are joined until the distances between all clusters in hierarchical clustering become greater than a threshold value used to determine the same face. Alternatively, for the clustering, a method is used in which the cluster is partitioned into two clusters by partition-optimization clustering such as k-means, and cluster partitioning is repeated until the spread of the clusters becomes less than a threshold value. The clustering method is not limited to these methods.

As a result of the clustering, the clustering unit 412 treats the face group belonging to the cluster with the greatest number of face groups constituting the cluster as a first candidate face group, and supplies information about several high-ranking face groups to the selection screen display control unit 413 and the face group configuration unit 414.

The selection screen display control unit 413, in one process, when there is a user selection, generates a selection screen enabling the selection of one face group name from among candidate face group names made up of face group names that are candidates for the face group to associate with the specific person. The selection screen display control unit 413 causes the display unit 141 to display the generated selection screen. In addition, on the basis of a face group selection signal by the user input via the operating input unit 142, the selection screen display control unit 413 treats the user-selected face group as a first candidate face group, and supplies information about several high-ranking face groups to the face group configuration unit 414.

In one process, when there is a user selection, the face group configuration unit 414 configures the first candidate face group supplied from the selection screen display control unit 413 as the face group to associate with the specific name. In one process, when there is no user selection, the face group configuration unit 414 configures the first candidate face group supplied from the clustering unit 412 as the face group to associate with the specific name.

[Example of Face Group Determination Process]

Figure 26:
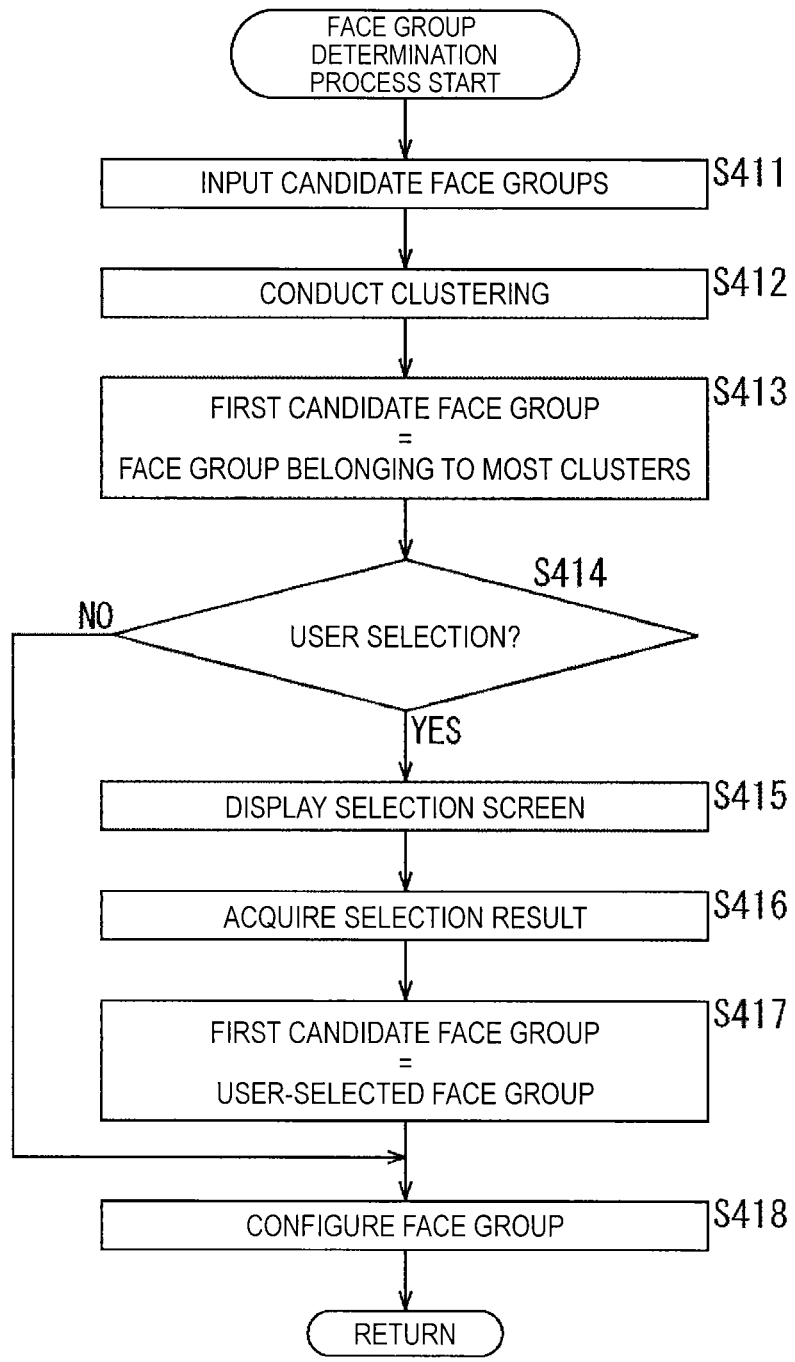
FIG. 26 is a flowchart describing a face group determination process.

Next, the face group determination process in step S213 of FIG. 17 executed by the face group determination unit 223 of FIG. 25 will be described with reference to the flowchart in FIG. 26.

In step S411, the candidate face group input unit 411 inputs and supplies to the clustering unit 412 the candidate face groups from the candidate face group acquisition unit 272.

In step S412, the clustering unit 412 conducts clustering using the face feature values of the representative face image of each candidate face group, and collects the faces of the same person into a single cluster.

In step S413, as a result of the clustering, the clustering unit 412 treats the face group belonging to the cluster with the greatest number of face groups constituting the cluster as a first candidate face group, and supplies information about several high-ranking face groups to the selection screen display control unit 413 and the face group configuration unit 414.

In step S414, in one process, the selection screen display control unit 413 determines whether or not there is a user selection. In the case of determining that there is a user selection in step S414, the process proceeds to step S415.

In step S415, the selection screen display control unit 413 generates a selection screen enabling the selection of one face group name from among candidate face group names made up of face group names that are candidates for the face group to associate with the specific person. The selection screen display control unit 413 causes the display unit 141 to display the generated selection screen.

The user operates the operating input unit 142 to select a face group name to associate with the specific person. The operating input unit 142 supplies a selection signal corresponding to the selection to the selection screen display control unit 413.

In step S416, the selection screen display control unit 413 acquires a selection result from the operating input unit 142. In step S417, the selection screen display control unit 413 treats the user-selected face group as a first candidate face group, and supplies information about several high-ranking face groups to the face group configuration unit 414.

In step S414, in the case of determining that there is no user selection, the process skips steps S415 to S417, and proceeds to step S418.

In step S418, the face group configuration unit 414 configures a face group. In other words, in one process, when there is a user selection, the face group configuration unit 414 configures the first candidate face group supplied from the selection screen display control unit 413 as the face group to associate with the specific name. In one process, when there is no user selection, the face group configuration unit 414 configures the first candidate face group supplied from the clustering unit 412 as the face group to associate with the specific name.

Note that although the above describes an example of determining a face group in which several high-ranking face groups are treated as candidates and presented to the user for selection by the user, as described next, a selection may also be made using a network service or the like as external data.

[Exemplary Configuration of Face Group Determination Unit]

Figure 27:
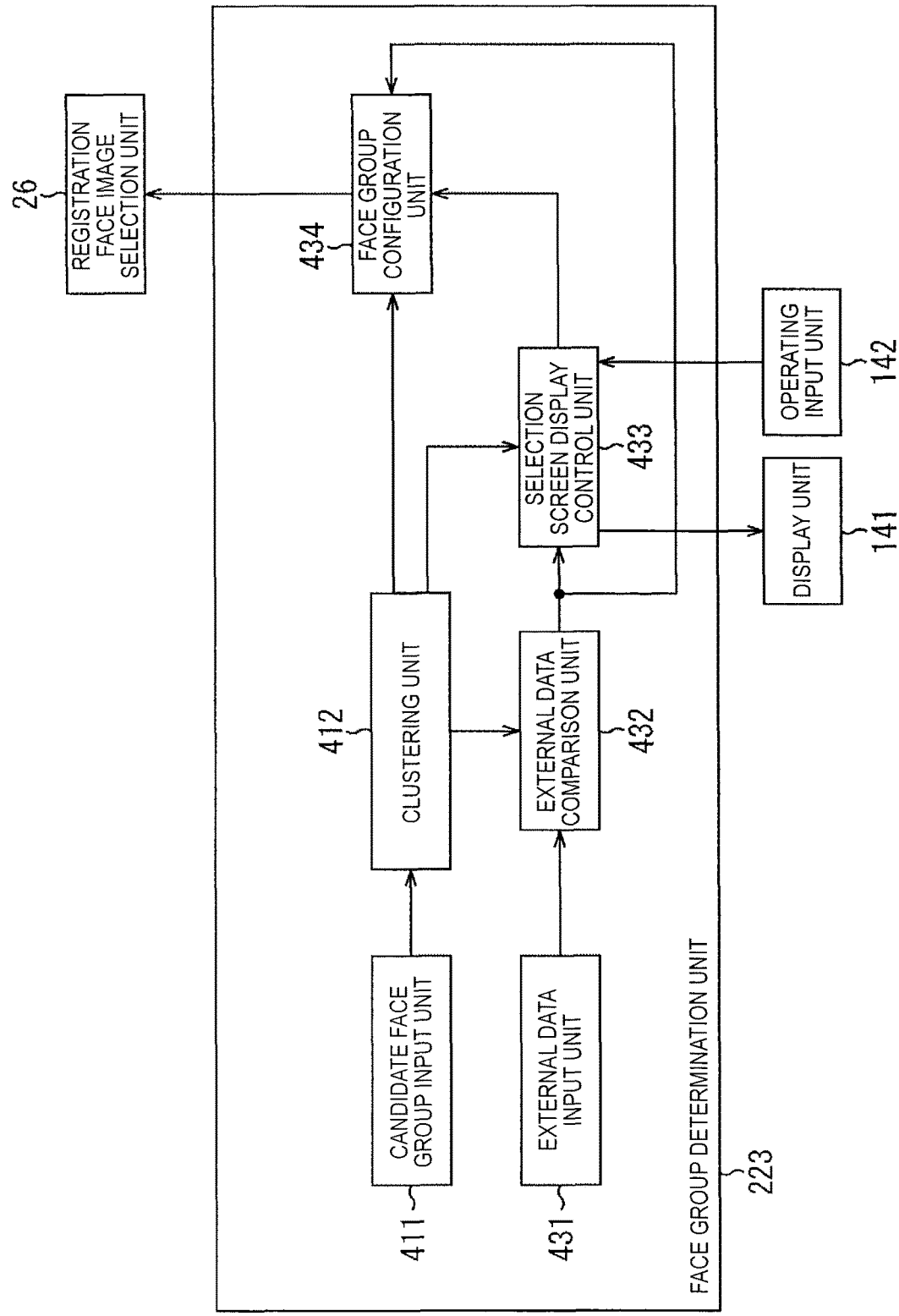
FIG. 27 is a block diagram illustrating another exemplary configuration of a face group determination unit.

FIG. 27 is a block diagram illustrating an exemplary configuration of a face group determination unit that makes a selection using a network service or the like as external data.

In the example of FIG. 27, the face group determination unit 223 includes the candidate face group input unit 411 and the clustering unit 412. Additionally, the face group determination unit 223 includes an external data input unit 431, an external data comparison unit 432, a selection screen display control unit 433, and a face group configuration unit 434.

The face group determination unit 223 of FIG. 27 is equipped with a candidate face group input unit 411 and a clustering unit 412, in common with the face group determination unit 223 of FIG. 25.

The face group determination unit 223 of FIG. 27 differs from the face group determination unit 223 of FIG. 25 in that the selection screen display control unit 413 and the face group configuration unit 414 are replaced with the selection screen display control unit 433 and the face group configuration unit 434. In addition, the face group determination unit 223 of FIG. 27 differs from the face group determination unit 223 of FIG. 25 with the addition of the external data input unit 431 and the external data comparison unit 432.

In other words, clustering unit 412 treats the face group belonging to the most clusters as a first candidate face group, and supplies information about several high-ranking face groups to the external data comparison unit 432, the selection screen display control unit 433, and the face group configuration unit 434.

The external data input unit 431 inputs and supplies to the external data comparison unit 432 external data made up of face feature values and the like of several high-ranking image search results conducted by an external network service or the like for the same name as the one input into the name input unit 21 of FIG. 16.

The external data comparison unit 432 compares the face feature values of several high-ranking image search results conducted by an external network service or the like from the external data input unit 431 with representative face feature values of several high-ranking face groups of small distance from the name/face group distance acquisition unit 133. As a result of the comparison, the external data comparison unit 432 treats the face group with the highest degree of similarity with the external data as a first candidate face group, and supplies information about several high-ranking face groups to the selection screen display control unit 433 and the face group configuration unit 434.

In one process, when external data is used and there is a user selection, the selection screen display control unit 433 generates a selection screen made up of face group names and the like that are candidates for the face group to associate with the specific person, on the basis of the face group information from the external data comparison unit 432. In one process, when external data is not used and there is a user selection, the selection screen display control unit 433 generates a selection screen made up of face group names and the like that are candidates for the face group to associate with the specific person, on the basis of the face group information from the clustering unit 412. The selection screen display control unit 413 causes the display unit 141 to display the generated selection screen.

On the basis of a face group selection signal by the user input via the operating input unit 142, the selection screen display control unit 413 treats the user-selected face group as a first candidate face group, and supplies information about several high-ranking face groups to the face group configuration unit 434.

In one process, when there is a user selection, the face group configuration unit 434 configures the first candidate face group supplied from the selection screen display control unit 433 as the face group to associate with the specific name. In one process, when external data is used and there is no user selection, the face group configuration unit 434 configures the first candidate face group supplied from the external data comparison unit 432 as the face group to associate with the specific name. In one process, when external data is not used and there is no user selection, the face group configuration unit 434 configures the first candidate face group supplied from the clustering unit 412 as the face group to associate with the specific name.

[Another Example of Face Group Determination Process]

Figure 28:
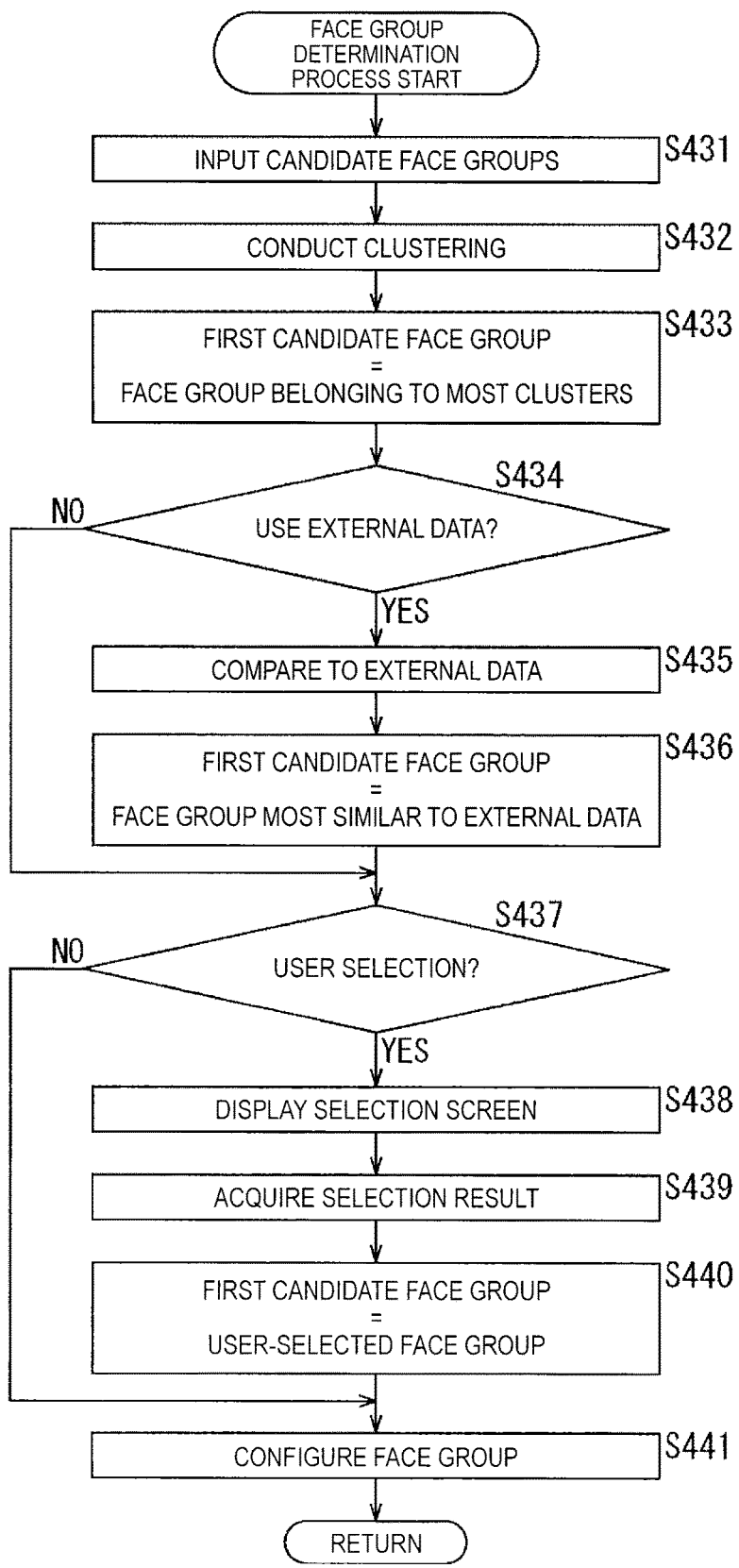
FIG. 28 is a flowchart describing another example of a face group determination process.

Next, the face group determination process in step S213 of FIG. 17 executed by the face group determination unit 223 of FIG. 27 will be described with reference to the flowchart in FIG. 28.

In step S431, the candidate face group input unit 411 inputs and supplies to the clustering unit 412 the candidate face groups from the candidate face group acquisition unit 272.

In step S432, the clustering unit 412 conducts clustering using the face feature values of the representative face image of each candidate face group, and collects the faces of the same person into a single cluster.

In step S433, as a result of the clustering, the clustering unit 412 treats the face group belonging to the cluster with the greatest number of face groups constituting the cluster as a first candidate face group, and supplies information about several high-ranking face groups to the selection screen display control unit 433 and the face group configuration unit 434.

In step S434, in one process, the external data comparison unit 432 determines whether or not to use external data. In the case of determining to use external data in step S434, the process proceeds to step S435.

In step S435, the external data comparison unit 432 conducts a process of comparing several high-ranking face groups belonging to the most clusters from the clustering unit 412 with external data from the external data input unit 431. In other words, the external data comparison unit 432 compares the face feature values of several high-ranking image search results conducted by an external network service or the like from the external data input unit 431 with representative face feature values of several high-ranking face groups belonging to the most clusters from the clustering unit 412.

In step S436, as a result of the comparison, the external data comparison unit 432 treats the face group with the highest degree of similarity with the external data as a first candidate face group, and supplies information about several high-ranking face groups to the selection screen display control unit 433 and the face group configuration unit 434.

In the case of determining to not use external data in step S434, the process skips steps S435 and S436, and proceeds to step S437.

In step S437, in one process, the selection screen display control unit 433 determines whether or not there is a user selection. In the case of determining that there is a user selection in step S437, the process proceeds to step S438.

In step S438, the selection screen display control unit 433 generates a selection screen made up of information such as face group names that are candidates for the face group to associate with the name, and causes the display unit 141 to display the generated selection screen.

Note that in one process, when external data is used and there is a user selection, the selection screen display control unit 433 generates a selection screen made up of face group names and the like that are candidates for the face group to associate with the name, on the basis of the face group information from the external data comparison unit 432. In one process, when external data is not used and there is a user selection, the selection screen display control unit 433 generates a selection screen made up of face group names and the like that are candidates for the face group to associate with the specific person, on the basis of the face group information from the clustering unit 412.

The user operates the operating input unit 142 to select a face group name to associate with the name. The operating input unit 142 supplies a selection signal corresponding to the selection to the selection screen display control unit 433.

In step S439, the selection screen display control unit 433 acquires a selection result from the operating input unit 142. In step S440, the selection screen display control unit 433 treats the user-selected face group as a first candidate face group, and supplies information about several high-ranking face groups to the face group configuration unit 434.

In step S437, in the case of determining that there is no user selection, the process skips steps S438 to S440, and proceeds to step S441.

In step S441, the face group configuration unit 434 configures a face group. In other words, in one process, when there is a user selection, the face group configuration unit 434 configures the first candidate face group supplied from the selection screen display control unit 433 as the face group to associate with the specific name. In one process, when external data is used and there is no user selection, the face group configuration unit 434 configures the first candidate face group supplied from the external data comparison unit 432 as the face group to associate with the specific name. In one process, when external data is not used and there is no user selection, the face group configuration unit 434 configures the first candidate face group supplied from the clustering unit 412 as the face group to associate with the specific name.

As above, in the information processing device 211 of FIG. 16, content in which a name possibly occurs is selected, and from among face groups in each piece of selected content, the face groups having the greatest number of similar face groups appearing in other content are acquired as candidate face groups. Subsequently, the candidate face groups are clustered, and the face group belonging to the cluster with the most candidate face groups is determined as the face group to associate with the name. Consequently, more efficient name registration work is possible.

As above, according to the present technology, since a face image and a face image feature value corresponding to a name are registered in a catalog, searches may be conducted, even if the input name is not registered in the catalog, for example.

In other words, in a name-based video or image search of the past, a specific person is determined to occur or not according to a comparison with the face feature values of persons already registered in a catalog, and videos or images in which the specific person occurs are presented as search results.

According to the present technology, the registration of a name and a face image feature value into the catalog is automated, thereby enabling more efficient work.

Particularly, for the association of a person and a face image, it is possible to conduct association on the basis of not only manually applied information that may be accurate, such as an EPG, for example, but also information related to names automatically acquired by various identification processes from within a video.

In addition, according to the present technology, it is possible to associate a name with a face image having a relatively high occurrence frequency rather than a face image common within all content. Consequently, the association of a name and a face image becomes possible even in the hypothetical case in which the specific person does not occur or a face image of the person could not be detected in the candidates of moving images in which the person occurs.

Furthermore, according to the present technology, during catalog registration, a representative face of each cluster obtained by clustering selected face image collections is selected. Consequently, a face image having various features may be registered, and personal identification performance may be improved.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

3. Third Embodiment (Computer)

[Configuration Example of Computer]

FIG. 29 illustrates a configuration example of hardware of a computer that executes the above series of processes by programs.

In the computer 500, a central processing unit (CPU) 501, a read only memory (ROM) 502 and a random access memory (RAM) 503 are mutually connected by a bus 504.

An input/output interface 505 is also connected to the bus 504. An input unit 506, an output unit 507, a storage unit 508, a communication unit 509, and a drive 510 are connected to the input/output interface 505.

The input unit 506 is configured from a keyboard, a mouse, a microphone or the like. The output unit 507 configured from a display, a speaker or the like. The storage unit 508 is configured from a hard disk, a non-volatile memory or the like. The communication unit 509 is configured from a network interface or the like. The drive 510 drives a removable recording medium 511 such as a magnetic disk, an optical disk, a magneto-optical disk, a semiconductor memory or the like.

In the computer configured as described above, the CPU 501 loads a program that is stored, for example, in the storage unit 508 onto the RAM 503 via the input/output interface 505 and the bus 504, and executes the program. Thus, the above-described series of processing is performed.

As one example, the program executed by the computer (the CPU 501) may be provided by being recorded on the removable recording medium 511 as a packaged medium or the like. The program can also be provided via a wired or wireless transfer medium, such as a local area network, the Internet, or a digital satellite broadcast.

In the computer, by loading the removable recording medium 511 into the drive 510, the program can be installed into the storage unit 508 via the input/output interface 505. It is also possible to receive the program from a wired or wireless transfer medium using the communication unit 509 and install the program into the storage unit 508. As another alternative, the program can be installed in advance into the ROM 502 or the storage unit 508.

It should be noted that the program executed by a computer may be a program that is processed in time series according to the sequence described in this specification or a program that is processed in parallel or at necessary timing such as upon calling.

In the present disclosure, steps of describing the above series of processes may include processing performed in time-series according to the description order and processing not processed in time-series but performed in parallel or individually.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

For example, the present disclosure can adopt a configuration of cloud computing which processes by allocating and connecting one function by a plurality of apparatuses through a network.

In addition, in the case where a plurality of processes is included in one step, the plurality of processes included in this one step can be executed by one apparatus or by allocating a plurality of apparatuses.

Further, an element described as a single device (or processing unit) above may be divided to be configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, the present technology is not limited to the embodiments described above, and various changes and modifications may be made without departing from the scope of the technology.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

An information processing device including:

a content selection unit configured to select content including at least one name specified by a user;

a face group acquisition unit configured to acquire face groups by grouping, per person, face images occurring in content selected by the content selection unit; and a face group determination unit configured to determine a face group to associate with the name from face groups acquired by the face group acquisition unit.

(2)

The image processing device according to (1), wherein the content selection unit acquires a name occurrence pattern indicating whether or not the name occurs within selected content, the face group acquisition unit acquires face group occurrence patterns indicating whether or not there is an occurrence in all content selected by the content selection unit, and the face group determination unit determines a face group to associate with the name on the basis of a similarity between the name occurrence pattern acquired by the content selection unit, and the face group occurrence patterns acquired by the face group acquisition unit.

(3)

The image processing device according to (2), wherein the content selection unit acquires the name occurrence pattern on the basis of text information or speech information within selected content, or specific person occurrence frequency data in which an occurrence frequency of a specific person obtained as a result of identifying metadata attached to content is expressed in a time series.

(4)

The image processing device according to (2) or (3), further including:

a display control unit configured to control display of a screen enabling selection of one face group from a plurality of face groups for which the similarity is high; and a selection unit configured to select the one face group according to a user operation, wherein the face group determination unit determines a face group selected by the selection unit as the face group to associate with the name.

(5)

The image processing device according to any one of (2) to (4), further including:

a comparison unit configured to compare a face group for which the similarity is high with external search result data for the name, wherein the face group determination unit determines a face group that is most similar to the external search result data from among a plurality of face groups for which the similarity is high as the face group to associate with the name.

(6)

The image processing device according to (1), wherein the content selection unit selects content in which the name possibly occurs, the face group acquisition unit acquires, from among face groups in each piece of content selected by the content selection unit, as candidate face groups, face groups having a greatest number of similar face groups appearing in other content, and the face group determination unit clusters candidate face groups acquired by the face group acquisition unit, and determines a face group belonging to a cluster with the most candidate face groups as the face group to associate with the name.

(7)

The image processing device according to (6), wherein the content selection unit selects content in which the name possibly occurs on the basis of text information or speech information within selected content, or specific person occurrence frequency data in which an occurrence frequency of a specific person obtained as a result of identifying metadata attached to content is expressed in a time series.

(8)

The image processing device according to (6) or (7), wherein the face group acquisition unit excludes face groups having a low possibility to associate with the name from among face groups in each piece of content selected by the content selection unit, and acquires, from among the other face groups, as candidate face groups, face groups having a greatest number of similar face groups appearing in other content.

(9)

The image processing device according to (6) or (7), further including:

a display control unit configured to control display of a screen enabling selection of one face group from a plurality of face groups belonging to clusters with many of the candidate face groups; and a selection unit configured to select the one face group according to a user operation, wherein the face group determination unit determines a face group selected by the selection unit as the face group to associate with the name.

(10)

The image processing device according to (6) or (7), further including:

a comparison unit configured to compare a plurality of face groups belonging to clusters with many of the candidate face groups with external search result data for the name, wherein the face group determination unit determines a face group that is most similar to the external search result data from among a plurality of face groups belonging to clusters with many of the candidate face groups as the face group to associate with the name.

(11)

The image processing device according to any one of (1) to (10), further including:

a face image selection unit configured to select a face image to register in a catalog from among a face image collection in a face group determined by the face group determination unit.

(12)

The image processing device according to (11), wherein the face image selection unit selects a representative face in each cluster as a result of clustering from among a face image collection in a face group determined by the face group determination unit as a face image to register in a catalog.

(13)

An information processing method performed by an information processing device, including:

selecting content including at least one name specified by a user;

acquiring face groups by grouping, per person, face images occurring in the selected content; and determining a face group to associate with the name from the acquired face groups.

(14) A program causing a computer to function as:

a content selection unit configured to select content including at least one name specified by a user;

a face group acquisition unit configured to acquire face groups by grouping, per person, face images occurring in content selected by the content selection unit; and a face group determination unit configured to determine a face group to associate with the name from face groups acquired by the face group acquisition unit.

REFERENCE SIGNS LIST 11 information processing device
21 name input unit
22 content archive
23 content selection unit
24 face group acquisition unit
25 face group determination unit
26 registration face image selection unit
27 face catalog
131 name occurrence pattern input unit
132 face group occurrence pattern input unit
133 name/face group distance acquisition unit
134 selection screen display control unit
135 face group configuration unit
141 display unit
142 operating input unit
151 external data input unit
152 external data comparison unit
153 selection screen display control unit
154 face group configuration unit
211 information processing device
221 content selection unit
222 face group acquisition unit
223 face group determination unit
271 in-content face group acquisition unit
272 candidate face group acquisition unit
411 candidate face group input unit
412 clustering unit
413 selection screen display control unit
414 face group configuration unit
431 external data input unit
432 external data comparison unit
433 selection screen display control unit
434 face group configuration unit

The invention claimed is:

1. An information processing device comprising:
    circuitry configured to
        select content including at least one name specified by a user;
        select a plurality of contents in which the name possibly occurs;
        acquire a plurality of face groups by grouping, per person, face images occurring in the plurality of contents selected by the circuitry;
        calculate, from among the plurality of face groups in each content selected by the circuitry, a number of similar face groups appearing in other content of the plurality of contents selected by the circuitry for each of the plurality of face groups by counting, for each of the plurality of face groups, a number of face groups that are similar in each of other content of the plurality of contents selected by the circuitry, the face group that is similar being determined by calculating a similarity between a face group in a content and each face group in other content of the plurality of contents selected by the circuitry, each of the plurality of contents selected by the circuitry including a plurality of face groups;
        acquire, from among the plurality of face groups in each content selected by the circuitry, as a candidate face group, a face group having a greatest number of similar face groups calculated as appearing in other content;
        determine a face group to associate with the name from face groups acquired by the circuitry by clustering each of the candidate face groups acquired by the circuitry using each face feature value in each candidate face group of each content, and determining a face group belonging to a largest cluster including a most number of candidate face groups as the face group to associate with the name;
        register, in a memory, the determined face group by associating the determined face group with the name for search; and
        identify a content including a person with a specified name using the registered face group in the memory.

2. The information processing device according to claim 1, wherein
    the circuitry is configured to:
        acquire a name occurrence pattern indicating whether or not the name occurs within selected content;
        acquire face group occurrence patterns indicating whether or not there is an occurrence in all content selected by the circuitry; and
        determine a face group to associate with the name on the basis of a similarity between the name occurrence pattern acquired by the circuitry, and the face group occurrence patterns acquired by the circuitry.

3. The information processing device according to claim 2, wherein
    the circuitry is configured to acquire the name occurrence pattern on the basis of text information or speech information within selected content, or person occurrence frequency data in which an occurrence frequency of a person obtained as a result of identifying metadata attached to content is expressed in a time series.

4. The information processing device according to claim 2, wherein
    the circuitry is configured to:
        control display of a screen enabling selection of one face group from a plurality of face groups for which the similarity is high;
        select the one face group according to a user operation; and
        determine a face group selected according to the user operation as the face group to associate with the name.

5. The information processing device according to claim 2, wherein
    the circuitry is configured to:
        compare a face group for which the similarity is high with external search result data for the name; and
        determine a face group that is most similar to the external search result data from among a plurality of face groups for which the similarity is high as the face group to associate with the name.

6. The information processing device according to claim 1, wherein the circuitry is configured to select content in which the name possibly occurs on the basis of text information or speech information within selected content, or person occurrence frequency data in which an occurrence frequency of a person obtained as a result of identifying metadata attached to content is expressed in a time series.

7. The information processing device according to claim 1, wherein
the circuitry is configured to exclude face groups having a low possibility to associate with the name from among face groups in each piece of content selected by the circuitry, and acquire, from among the other face groups, as candidate face groups, face groups having a greatest number of similar face groups appearing in other content.

8. The information processing device according to claim 1, wherein
the circuitry is configured to:
control display of a screen enabling selection of one face group from a plurality of face groups belonging to clusters with many of the candidate face groups; and
select the one face group according to a user operation; and
determine a face group selected by the circuitry as the face group to associate with the name.

9. The information processing device according to claim 1, wherein
the circuitry is configured to:
compare a plurality of face groups belonging to clusters with many of the candidate face groups with external search result data for the name; and
determine a face group that is most similar to the external search result data from among a plurality of face groups belonging to clusters with many of the candidate face groups as the face group to associate with the name.

10. The information processing device according to claim 1, wherein
the circuitry is configured to select a face image to register in a catalog from among a face image collection in a face group determined by the circuitry.

11. The information processing device according to claim 10, wherein
the circuitry is configured to select a representative face in each cluster as a result of clustering from among a face image collection in a face group determined by the circuitry as a face image to register in a catalog.

12. The information processing device according to claim 1, wherein
the circuitry is configured to select the plurality of contents in which the name possibly occurs based at least one of text information within content, speech information within content, and metadata attached to content.

13. An information processing method, comprising:
selecting content including at least one name specified by a user;
selecting a plurality of contents in which the name possibly occurs;
acquiring a plurality of face groups by grouping, per person, face images occurring in the plurality of selected contents;
calculating, using circuitry, from among the plurality of face groups in each content, a number of similar face groups appearing in other content of the plurality of selected contents for each of the plurality of face groups by counting, for each of the plurality of face groups, a number of face groups that are similar in each of other content of the plurality of contents selected by the circuitry, the face group that is similar being determined by calculating a similarity between a face group in a content and each face group in other content of the plurality of contents selected by the circuitry, each of the plurality of contents selected by the circuitry including a plurality of face groups;
acquiring, from among the plurality of face groups in each content, as a candidate face group, a face group having a greatest number of similar face groups calculated as appearing in other content;
determining, using the circuitry, a face group to associate with the name from the acquired face groups by clustering each of the candidate face groups using each face feature value in each candidate face group of each content, and determining a face group belonging to a largest cluster including a most number of candidate face groups as the face group to associate with the name;
registering, in a memory, the determined face group by associating the determined face group with the name for search; and
identifying a content including a person with a specified name using the registered face group in the memory.

14. A non-transitory computer readable medium including executable instructions, which when executed by a computer cause the computer to:
select content including at least one name specified by a user;
select a plurality of contents in which the name possibly occurs;
acquire a plurality of face groups by grouping, per person, face images occurring in the plurality of contents selected by the computer;
calculate, from among the plurality of face groups in each content selected by the computer, a number of similar face groups appearing in other content of the plurality of selected contents for each of the plurality of face groups by counting, for each of the plurality of face groups, a number of face groups that are similar in each of other content of the plurality of contents selected by the circuitry, the face group that is similar being determined by calculating a similarity between a face group in a content and each face group in other content of the plurality of contents selected by the circuitry, each of the plurality of contents selected by the circuitry including a plurality of face groups;
acquire, from among the plurality of face groups in each content selected by the computer, as a candidate face group, a face group having a greatest number of similar face groups calculated as appearing in other content;
determine a face group to associate with the name from face groups acquired by the computer by clustering each of the candidate face groups acquired by the computer using each face feature value in each candidate face group of each content, and determining a face group belonging to a largest cluster including a most number of candidate face groups as the face group to associate with the name;
register, in a memory, the determined face group by associating the determined face group with the name for search; and identify a content including a person with a specified name using the registered face group in the memory.

* * * * *